United States Patent [19]

Dobo et al.

[11] 4,175,153
[45] Nov. 20, 1979

[54] INORGANIC ANISOTROPIC HOLLOW FIBERS

[75] Inventors: Emerick J. Dobo, Cary; Tommy E. Graham, Raleigh, both of N.C.

[73] Assignee: Monsanto Company, St. Louis, Mo.

[21] Appl. No.: 906,502

[22] Filed: May 16, 1978

[51] Int. Cl.$^2$ ............................................. D02G 3/00
[52] U.S. Cl. ...................................... 428/398; 55/16; 210/510; 264/41; 264/63; 428/376; 428/379; 428/400; 428/401
[58] Field of Search ............... 428/398, 376, 379, 364, 428/400, 401; 55/16; 264/62, 41, 42, 43, 44, 47, 63, 59; 210/510

[56] References Cited

U.S. PATENT DOCUMENTS

| | | | |
|---|---|---|---|
| 2,900,708 | 8/1959 | Pond | 29/194 |
| 2,911,057 | 11/1959 | Green et al. | 183/2 |
| 2,961,062 | 11/1960 | Hunter et al. | 183/2 |
| 3,001,871 | 9/1961 | Thien-Chi | 75/211 |
| 3,022,187 | 2/1962 | Eyraud et al. | 428/545 |
| 3,052,967 | 9/1962 | Fischer | 264/59 X |
| 3,111,396 | 11/1963 | Ball | 25/156 |
| 3,226,263 | 12/1965 | Oswin | 136/120 |
| 3,228,797 | 1/1966 | Brown et al. | 136/86 |
| 3,238,700 | 3/1966 | Cohn | 55/16 |
| 3,241,298 | 3/1966 | Pierce | 55/158 X |
| 3,246,764 | 4/1966 | McCormack | 210/321 |
| 3,287,112 | 11/1966 | Blaha | 75/222 |
| 3,303,055 | 2/1967 | Gumucio | 136/120 |
| 3,311,689 | 3/1967 | Kelsey | 264/59 X |
| 3,351,487 | 11/1967 | Levine et al. | 427/115 |
| 3,385,915 | 5/1968 | Hamling | 264/42 X |
| 3,406,025 | 10/1968 | Hamling | 75/0.5 |
| 3,498,909 | 3/1970 | Littman | 210/23 |
| 3,509,694 | 5/1970 | Imai et al. | 55/16 |
| 3,529,044 | 9/1970 | Santangelo | 264/29 |
| 3,565,749 | 2/1971 | Wizon | 264/65 X |
| 3,567,810 | 3/1971 | Baker | 264/41 |
| 3,639,953 | 2/1972 | Kimura | 264/171 X |
| 3,652,749 | 3/1972 | Sobel et al. | 264/63 |
| 3,671,228 | 6/1972 | McIntire et al. | 75/207 |
| 3,695,869 | 10/1972 | Hivert | 264/59 X |
| 3,697,262 | 10/1972 | Fenner | 75/214 |
| 3,713,865 | 1/1973 | Leeds | 252/504 X |
| 3,724,672 | 4/1973 | Leonard et al. | 210/500 |
| 3,725,186 | 4/1973 | Lynch | 156/89 |
| 3,745,202 | 7/1973 | Riggleman et al. | 264/41 |
| 3,846,527 | 11/1974 | Winter et al. | 264/63 |
| 3,897,221 | 7/1975 | Salyer et al. | 264/44 X |
| 3,907,954 | 9/1975 | Mansmann et al. | 264/63 |
| 3,947,534 | 3/1976 | Mansmann et al. | 264/62 |
| 3,950,478 | 4/1976 | Kenworthy et al. | 264/234 |
| 3,973,234 | 8/1976 | Youtsey et al. | 338/226 |
| 3,975,478 | 8/1976 | Leonard | 264/41 |
| 3,981,749 | 9/1976 | Fukuda et al. | 429/41 |
| 4,053,662 | 10/1977 | Bergez | 55/158 X |
| 4,105,548 | 8/1978 | Baker et al. | 210/23 H |

FOREIGN PATENT DOCUMENTS 45-28692 9/1970 Japan ......................................... 264/62

*Primary Examiner*—Lorraine T. Kendell
*Attorney, Agent, or Firm*—Howard C. Stanley

[57] ABSTRACT

Essentially inorganic monolithic hollow fibers having a radially anisotropic internal void volume wall structure. Process for the production of such fibers. Apparatus and processes using such fibers.

42 Claims, 9 Drawing Figures

100.0 U ⊢────┤

0 10.0 u ⊢——⊣
05-2 20.0 09 166 101

100.0 u ⊢————⊣
16-1 20.0 23 166 302

0 10.0 u ⊢―――――⊣
20-2 20.0 17 19 1 10 1

INORGANIC ANISOTROPIC HOLLOW FIBERS

FIELD OF THE INVENTION

This invention relates to inorganic anisotropic hollow fibers, processes to produce such fibers and apparatus and processes that use such fibers. These fibers are useful in many fields, such as fluid separations, fuel cells and catalysis. They are particularly amenable to applications involving gas diffusion, e.g., hydrogen diffusion.

Separating fluids from fluid mixtures is an especially important procedure in the chemical processing industry. In order for the separation of a desired fluid by the use of separation membranes to be commercially attractive, the membranes must be capable of withstanding the conditions to which they may be subjected during the separation operation and must provide an adequately selective separation of the fluid together with a sufficiently high flux, i.e., permeation or diffusion rate per unit surface area, so that the use of the separation procedure is on an economically attractive basis. Thus separation membranes which exhibit adequately high selective separation, but undesirably low fluxes, may require such large separating membrane surface area that the large scale commercial use of these membranes is not economically feasible.

It is known that hydrogen may be separated and purified from a gaseous mixture containing hydrogen and other gases by allowing the hydrogen to permeate selectively, at elevated temperatures, through thin non-porous noble metal barriers. In this process, hydrogen under pressure is brought into contact with one side of such non-porous barriers. The other side of the barrier is maintained at a lower hydrogen partial pressure. The hydrogen diffuses through the barrier and is recovered in purified form.

Among the factors on which the diffusion of hydrogen per unit area through such barriers depends are the thickness of the barrier, the partial pressure differential between the high and low pressure sides of the barrier, the temperature of the barrier and the material from which the barrier is made.

Although the diffusivity of a barrier, i.e., the ability of the barrier material to permit a particular gas to diffuse therethrough, does not depend upon the thickness of the barrier, the rate of diffusion is inversely proportional to such thickness. Since high diffusion rates are essential for the commercial feasibility of such barriers, it is necessary that the barrier be as thin as possible, consistent with structural stability under commercial operating conditions, and that it provide a sufficiently large surface area for diffusion. Considerable efforts over a long period of time have been expended in attempts to develop such thin barriers having large surface areas which will sustain such high diffusion rates while withstanding operating conditions. These efforts have extended over at least half a century. For instance, Snelling in U.S. Pat. No. 1,174,631 described a process for utilizing a metal, such as palladium or platinum, film maintained at an elevated temperature and supported by a base of porous earthenware or alundum. Snelling also described such a film supported on a porous cylindrical tube.

Other workers have utilized thin metal barriers supported on backings such as porous metal, ceramic, screen guards or other suitable material to preclude distortion or collapse of the thin metal barrier. Difficulties have arisen with such thin barriers for hydrogen diffusion. For instance, attempts have been made to produce large surface area barriers of about 1 mil (about 25 microns) in thickness by rolling, vapor deposition, and electroplating, however, these barriers have proved to be troublesome if not unsatisfactory. Such barriers are difficult to fabricate by rolling without pin holes which result in unsatisfactory performance as a separating barrier. Other procedures such as for instance by vapor deposition and electroplating are extremely slow and impractical.

Significant efforts have been expended in attempts to provide supported planar metal barriers which would provide commercially feasible hydrogen diffusion devices. See, for instance, U.S. Pat. Nos. 2,958,391, 3,208,198, 3,238,700, 3,344,582, 3,344,586, 3,350,846, 3,413,777 and 3,499,265. These efforts do not appear to have resulted in commercially advantageous hydrogen diffusion devices.

It has also been proposed to utilize elongated tubes (which may be coiled) which do not require a separate support. These tubes can be provided either singly or in multiple bundles in order to increase the surface area for diffusion. Such bundles of tubes are illustrated, for instance, in U.S. Pat. No. 2,961,062 of Hunter et al utilizing palladium-containing capillary tubes which are described as being drawn to wall thicknesses of from about 25 microns to 126 microns, with a bore diameter of from 794 microns to 3,175 microns. These tubes appear to have "dense" or "compact" walls, i.e., an isotropic wall structure. Although the capillary tubes of Hunter et al may provide technically feasible hydrogen diffusion cells, the practical limitations of drawing tubes of such diameters and wall thicknesses result in devices that are extremely expensive to produce. This is due both to the high cost of palladium and the tube drawing procedures. Because of this expense it is extremely important that the tube drawing procedure produce tubes which are substantially satisfactory for use with limited margin for error which will result in loss of materials. That is, the wall thicknesses utilized must be satisfactory for both structural support and to avoid flaws that may allow gases other than hydrogen to pass through the barrier. Although it is known that smaller tubes will enable the use of thinner walls (because the inherent geometry of smaller tubes provides equal strength with thinner walls) it has been difficult to produce such smaller tubes which have wall thicknesses commensurate with the desired operating conditions. This is due to the practical limitations of small tube production by tube drawing procedures and the prohibitive costs involved. Other workers have investigated the use of small tubes having dimensions similar to those of Hunter et al. See, for instance, U.S. Pat. Nos. 2,911,057, 3,238,700, 3,172,742, 3,198,604, 3,208,198, 3,226,915, 3,278,268, 3,392,510, 3,368,329, 3,522,019, 3,665,680 and British Pat. No. 1,039,381. All of the tubes utilized in the disclosed devices appear to have isotropic wall structures (barring flaws). These workers have not suggested the use of smaller tubes or tubes having walls that are not isotropic. To date, metal tubes possessing strong economic potential have been elusive.

The present invention provides barriers that readily meet this objective. In addition to discovering thin metal barriers which are highly suitable as the barrier components in, e.g., economically feasible hydrogen diffusion apparatus, it has also been discovered that these components are useful in apparatus and processes in many other applications. Of particular interest is the broad field of fluid separations by membranes.

The use of polymeric hollow fibers as separation membranes in various fluid separation procedures is well recognized as having great advantages over planar membranes. This is due to the inherent geometry of the hollow fibers which provide a large membrane surface area for separation within a unit volume of the apparatus containing them. Furthermore, such hollow fibers are known to be able to withstand greater pressure differentials than unsupported planar membranes of essentially the same total thickness and physical structure.

More recently, polymeric hollow fibers useful in fluid separations have been provided which have a so-called "Loeb-type" wall structure. This term derives from the work of Loeb et al who found that, with planar membranes, by using particular preparative techniques, they could greatly increase the water permeability through cellulose acetate membranes. U.S. Pat. Nos. 3,133,132, 3,133,137 and 3,170,867 describe this method which results in what has subsequently been termed a "modified" membrane structure. This polymeric structure has been extensively studied using differential dyeing techniques as well as electron microscopy. Unlike previous commercial cellulose acetate membranes, which appeared to be fully dense and without void structure, the membrane formed by the casting procedure of Loeb et al has been said to have a void containing region and a separate dense region. The porous region usually extended from the surface which was adjacent to the casting surface during formation through approximately 90-99% of the total membrane thickness. The remaining "dense" region extends to the opposite surface. In other words, since the membranes are not of essentially the same density throughout their thickness, they are deemed "anisotropic", i.e., they have distinct differences in void volume in different regions of the membrane thickness.

Other workers extended this anisotropic structure to polymeric hollow fibers. See, for instance, U.S. Pat. Nos. 3,674,628, 3,724,672, 3,884,754, and 4,055,696.

These anisotropic polymeric hollow fibers have been used as supports for separation membranes or as the separation membrane itself. Unfortunately, although these polymeric hollow fibers have been used in desalination procedures and may provide excellent separation properties they are often subject to limited usefulness and/or deterioration of such properties due to their operating environments. For instance, numerous chemicals as well as undesirable chemical contaminants in liquid and gaseous streams may cause undesirable reactions with the polymeric materials. Likewise, higher temperatures and pressures are often incompatible with maintaining the desired properties of such polymeric fibers. Furthermore, these polymeric hollow fibers do not approach the selectivity of the noble metal barriers.

Porous glass hollow fibers have been suggested as supports for permeable membranes as well as the separation membrane itself. See for instance, U.S. Pat. Nos. 3,246,764 and 3,498,909. Such glass hollow fibers appear to have an isotropic internal void volume wall structure.

Although numerous procedures have been suggested for preparing inorganic fibers (see, for instance, U.S. Pat. Nos. 3,321,285, 3,311,689, 3,385,915, 3,529,044, 3,565,749, 3,652,749, 3,671,228, 3,709,706, 3,795,524, 3,846,527, 3,953,561, 4,023,989, 4,060,355, and 4,066,450) it appears that there has been no suggestion of the inorganic anisotropic hollow fibers of the present invention.

In the description of the present invention, the following definitions are used.

The term "hollow fiber" as used in this application means a fiber (or monofilament) which has a length which is very large as compared to its diameter and has an axially disposed continuous channel which is devoid of the material that forms the fiber (more commonly referred to as the "bore"). Such fibers can be provided in virtually any length desired for the use intended.

The term "internal void volume" is used to denote space included within the fiber wall devoid of the material that forms the fiber.

A region in the fiber wall is said to be a "compact layer" when it is relatively dense (having substantially less and often virtually no internal void volume) and is located in barrier-like relation to fluid flow through the wall. It may be either porous or essentially non-porous. The term "porous" refers to that characteristic of a compact layer which, although otherwise being continuously relatively dense, has very small, often tortuous, passageways that permit the passage of fluid through the compact layer other than by diffusion.

The term "skin" is used to denote a compact layer that is at an internal and/or external surface of the fiber.

The term "peripheral external zone" is used to denote the external region of the fiber wall, the thickness of which is one-quarter to one-half the distance separating the external surface of the fiber from the internal surface, it being understood that this external region of the fiber may optionally be covered by a skin.

The term "peripheral internal zone" is used to denote the internal region of the fiber wall which surrounds the bore, the thickness of which is one-quarter to one-half the distance separating the internal surface of the fiber from the external surface, it being understood that this region surrounding the bore may be separated from the bore by a skin.

The phrase "essentially inorganic materials" denotes a sinterable inorganic material that is substantially free of organic polymeric material.

The term "monolithic" means that the material of the fiber has the same composition throughout its structure with the fiber maintaining its physical configuration due to the bonding between the sintered particles.

The phrase "radially anisotropic internal void volume" means that the void volume within the fiber wall varies in a direction perpendicular to the axis of the fiber.

SUMMARY OF THE INVENTION

The present invention provides essentially inorganic, monolithic hollow fibers having a radially anisotropic internal void volume wall structure. Preferred forms of such fibers are those that have a porous or essentially non-porous compact layer. Such fibers comprising metal and having an essentially non-porous compact layer are particularly preferred.

The present invention also provides a process for producing such fibers comprising (a) preparing a solution of an organic fiber-forming polymer containing, in uniformly dispersed form, a sinterable inorganic material; (b) extruding the inorganic material-containing polymer solution through a hollow fiber spinneret; (c) forming a precursor polymeric hollow fiber laden with the inorganic material and having a radially anisotropic internal void volume wall structure; (d) treating the precursor polymeric hollow fiber to remove the organic polymer; and (e) sintering the resulting inorganic material; provided that steps (d) and (e) are conducted under conditions that maintain a radially anisotropic internal void volume wall structure in the hollow fiber. A preferred form of the process is where the inorganic material is oxidized or reduced to a sinterable inorganic material during or prior to sintering. The essentially inorganic hollow fiber produced will have a wall structure which substantially correlates with the wall structure of the precursor polymeric hollow fiber but on a reduced scale due to shrinkage.

This invention also provides improved processes and apparatus employing such fibers. For instance, metal fibers having an essentially non-porous compact layer are particularly useful in improving processes and apparatus involving gas diffusion. This is particularly advantageous for both the production of hydrogen in substantially pure form and to economically shift equilibrium reactions which involve hydrogen. Still other processes and apparatus will advantageously employ fibers of this invention, both with or without compact layers, as supports for inorganic membranes and/or polymeric membranes. The hollow fibers of this invention are also useful in improving processes and apparatus for fuel cells and in other catalyzed reactions.

DESCRIPTION OF THE PREFERRED EMBODIMENTS

HOLLOW FIBER

Figure 1:
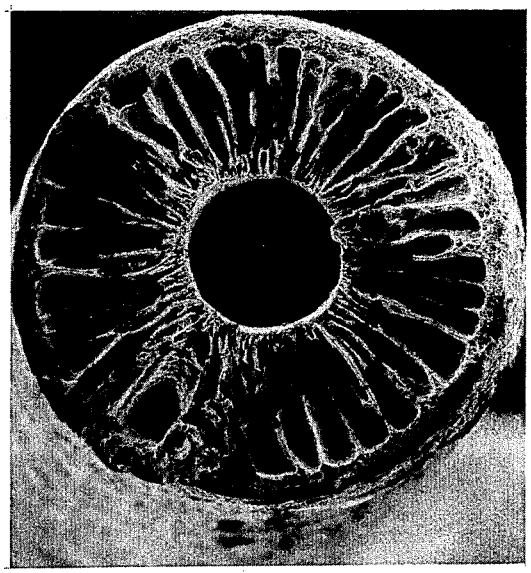
FIG. 1 shows a photomicrograph of a cross section of a polymeric precursor hollow fiber containing as the metal component a mixture of 50% nickel oxide and 50% iron oxide, both by weight, having a radially anisotropic internal void volume wall structure.

The essentially inorganic, monolithic hollow fibers of this invention have a radially anisotropic internal void volume wall structure. They have unique properties characterized by large surface areas (both within the wall structure and at the internal and external surfaces), ready access to these surface areas, and the ability to withstand high temperatures and pressures and difficult chemical environments. The fibers provided by the present invention are a major contribution to workers in numerous fields; for instance, in fluid separations by membrane (both as supports for separation membranes and as the membrane itself) and fuel cells, etc. These follow fibers can be prepared relatively economically with widely varying physical configurations while utilizing many types of inorganic materials. Furthermore, it has been found that large amounts of these fibers can be produced at low cost with only nominal losses due to flaws and imperfections.

The fibers of this invention comprise essentially inorganic materials which are sintered in hollow fiber form having the desired wall structure. The sinterable inorganic materials comprise a very large group of materials. The preferred sinterable inorganic materials are metals. Particularly preferred are the hydrogen diffusible metals such as the noble metals, nickel, etc. and their alloys. Iron and its alloys are particularly useful. Nickel and its alloys, i.e., iron, are the most preferred metals. The sinterable inorganic materials can be ceramics, such as aluminum oxide, $\beta$-alumina, etc. The sinterable inorganic materials can also be cermets or metcers, such as iron metal/aluminum oxide, nickel metal/titanium carbide, etc.

These fibers have a radially anisotropic internal void volume wall structure. In other words, where one region of the fiber wall may have a relatively high void volume, say, for instance, in the peripheral internal zone, another region of the fiber can have a substantially lower void volume say, for instance, in the peripheral external zone. These contrast with previously-known apparently isotropically porous inorganic hollow fibers (i.e., glass) which have substantially the same void volume throughout all regions of the fiber wall and the noble metal tubes which have isotropic dense or compact wall structures. The unique internal void volume of the fiber wall structure of the fibers of this invention at any particular radii (perpendicular to the fiber axis) from the center of the hollow fiber, may be essentially uniform. In other words, when such fibers have concentric bores, generally the internal void volume at all points in the wall on any cylindrical ring concentrically located around the fiber axis is substantially the same.

Fiber shapes other than circular are contemplated. For instance, having a square, hexagonal, star or oblong shape or with fins, etc. Such shapes can be influenced by the spinneret design utilized and the fiber extruding and forming conditions.

In general, the overall internal void volume (meaning that volume encompassed by the nominal internal and external surfaces of the fiber) can range from about 15 to about 95%. A preferred range of internal void volumes is from about 45 to about 90%. Fibers having an internal void volume in the peripheral external zone of from about 10 to about 35% and an internal void volume in the peripheral internal zone of from about 75 to about 95% are particularly desirable.

As mentioned above, these fibers have large surface areas. For instance, due to their relatively small outer diameters the diffusion surface area provided per unit volume is extremely large.

These fibers also have particularly large and useful surface areas within the wall structure. Since it is quite possible that the inorganic material may act in a dual capacity as both the supporting and/or functional structure of the fiber and as a catalytic material that will catalyze reactions contiguous to the fiber surfaces these available surface areas within the fiber wall can provide very significant advantages.

These fibers generally have an outer diameter of up to about 2,000 microns. However, fibers of larger outer diameters, such as 3,000 or 4,000 up to about 6,000 microns, are also contemplated. Such larger fibers may have to have thicker walls and would provide less active diffusion surface area per unit volume or may require a sacrifice in the possible operating conditions. More preferred fibers have an outer diameter of from about 50 to about 700, most preferably from 100 to 550, microns. The wall thickness is dependent on the bore size desired to avoid excessive pressure drop. The fibers often have wall thicknesses of from about 20 to about 300 microns. More particularly preferred are fibers having wall thicknesses of from about 50 to about 200 microns. The fibers generally have a wall thickness to outer diameter ratio of from about 0.5 to about 0.03, particularly preferred of from about 0.5 to about 0.1.

It should be understood that the structures of the walls of the fibers of the present invention are not equivalent to the walls of the noble metal tubes used in prior hydrogen diffusion processes due to the unique void volume characteristics. Accordingly, direct comparisons between wall thicknesses of such noble metal tubes and the wall thicknesses of the hollow fibers of this invention are inappropriate. Rather, since the walls of such tubes are substantially dense or compact with essentially little or no internal void volume they could more appropriately be compared to the essentially non-porous compact layer of the fibers of this invention which actually represents the portion of the wall thickness actually participating in the diffusion.

The fibers of this invention can have a compact layer which may be porous or essentially non-porous. The thickness of the compact layer is less than 50%, preferably less than 30%, more preferably less than 15% of the wall thickness. When referring to the essentially non-porous compact layer the thickness of the compact layer is conveniently expressed as the "effective thickness". This thickness being the thickness calculated from the actual amount of gas diffusing through the essentially non-porous compact layer and fiber wall and the intrinsic permeability of the material of the fiber. For this determination, the fiber could be tested with another gas to assure the presence of an essentially non-porous compact layer. With porous compact layers, the thickness can be estimated by, for instance, scanning electron microscopy. In general, for fibers having outer diameters up to about 1,000 microns, the compact layer thickness will be within the range of from about 2 to about 80 microns, e.g., about 4 to 60 microns, and more frequently about 10 to 50 microns.

Fibers having compact layers are particularly useful in gas separations where, for instance, with certain metals it is desired that only hydrogen diffuses through the essentially non-porous compact layer. The compact layer can be a skin at the external or internal fiber surfaces or can be within the fiber wall. A more preferred embodiment of the instant invention is a hollow fiber having a skin (as defined herein) on a peripheral external, or on a peripheral internal, zone (as defined herein), or both; the zone or zones comprising a network of mutually intercommunicating internal void volumes that become progressively larger or smaller in a radial direction when traversing from one zone to the other.

Particularly important fibers of this invention are those having relatively thin compact layers as a skin at the external fiber surface. Such fibers are very useful in fluid separation by membrane processes, for instance, in hydrogen diffusion processes. These fibers can act as supports (where the skin is porous) or as the membranes themselves (where the skin is essentially non-porous). They can exhibit adequate strength under high temperatures and/or pressures. Exemplary of fibers having a thin compact layer are metal, for instance, nickel alloy, fibers having a porous or essentially non-porous skin at their external surface which is from about 2 to about 40 microns thick, a wall thickness of from about 75 to about 125 microns and an outer diameter of from about 250 to about 700 microns.

It is well known that, as the outer diameter of a tubular shape decreases, the strength provided by a given wall thickness increases. Since fibers are now provided by the instant invention with relatively small outer diameters the wall thickness necessary for adequate strength is reduced. This provides tremendous advantages in numerous applications because of the much higher active diffusion or permeability surface area per unit volume available and the improved diffusion rates realized with thin walls and very thin skins. Furthermore, since such thin walls and very thin skins are now a viable alternative it is possible to use inorganic materials, i.e., nickel and its alloys, not previously considered practical due to their lower intrinsic permeabilities. This provides an improvement in cost, an improvement in strength and a material that is generally more conducive to hydrogen diffusion conditions. These advantages are realized with little or no sacrifice in operating temperatures and pressures.

Figure 2:
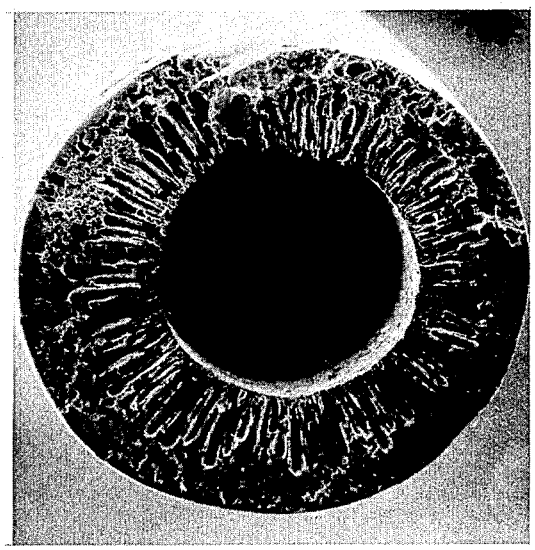
FIGS. 2 through 4 show photomicrographs of cross sections (or portions of a cross section) of hollow fibers having a radially anisotropic internal void volume wall structure that has a compact layer at the fiber's external surface (FIG. 2), internal surface (FIG. 3) and within the wall structure (FIG. 4).
Figure 3:
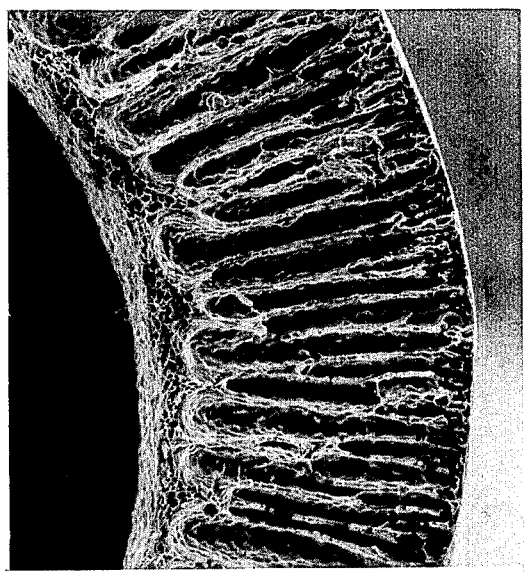
Figure 4:
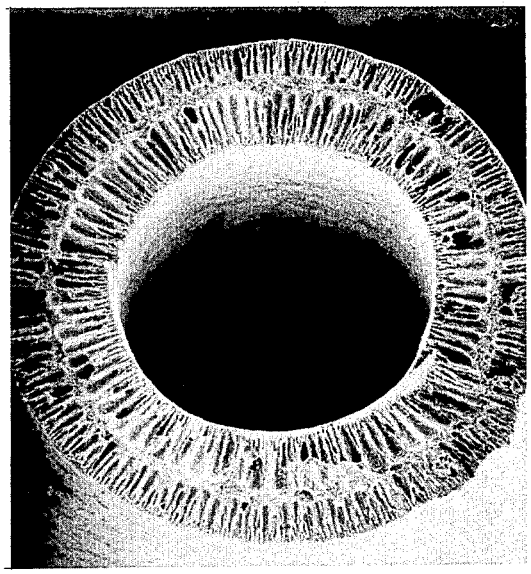

Particularly preferred forms of hollow fibers of this invention are shown in FIGS. 2, 3 and 4. FIG. 2 shows a photomicrograph of a cross section of a nickel hollow fiber having a radially anisotropic internal void volume wall structure and a skin at the fiber's external surface. The wall structure of the fiber has an internal void volume that increases from the peripheral external zone to the peripheral internal zone resulting in a very open wall structure at the peripheral internal zone immediately adjacent the bore. FIG. 3 shows a photomicrograph of a portion of a cross section of a nickel-iron alloy (about 50/50 by weight) hollow fiber having a skin at the internal surface. The fiber of FIG. 3 has an internal void volume that is lowest in the peripheral internal zone and which increases in the peripheral external zone and has a very open wall structure immediately adjacent the fiber's external surface. FIG. 4 shows a photomicrograph of a cross section of a nickel hollow fiber having a compact layer within the fiber wall which has very open wall structures at both the internal and external fiber surfaces.

An extremely important contribution of the present invention is the ability to provide inorganic hollow fibers with varying sizes and configurations. The size of the fiber can be influenced by the simple expedient of changing spinnerets as is well known in the synthetic fiber field. By varying the extrusion and fiber-forming conditions the wall structure can be varied over wide ranges to provide the desired wall structure and thickness. Furthermore, the thickness and location of a compact layer can also be provided as desired by means hereinafter described. These characteristics provide those skilled in the art with a unique ability to produce fibers tailored for the application of interest.

These features are provided by the process of this invention which is described more particularly below.

PROCESS TO PRODUCE THE FIBER

Preparation of Polymer Solution Containing Inorganic Material

A mixture which comprises an inorganic material in uniformly dispersed form in a polymer solution is prepared. The polymer solution comprises a fiber-forming organic polymer dissolved in a suitable solvent. In general the concentration of the organic polymer in the solution is sufficient to form, when the solution contains the inorganic material, the precursor polymeric hollow fibers having a radially anisotropic internal void volume wall structure by dry and/or wet spinning techniques. The polymer concentration can vary over a wide range and depends on the characteristics desired in the final hollow fiber. The maximum concentration is, of course, limited to that where the polymer solution containing the inorganic material is not amenable to extrusion through a spinneret. Correspondingly, the lower limit is where the polymeric precursor hollow fiber does not have a sfficient polymer to maintain its wall structure. In general, the polymer concentrations will be from about 5 to about 35% by weight of the polymer solution. Particularly preferred polymer concentrations are from about 10 to about 30%, more particularly preferred 15% to 30%, by weight of the polymer solution.

The nature of the organic polymer employed in the preparation of the polymeric precursor hollow fiber according to this invention is not critical; for example, polyacrylonitrile, polymers of acrylonitrile with one or more other monomers polymerizable therewith such as vinyl acetate, methyl methacrylate, urethanes and vinyl chloride may be used. Both addition and condensation polymers which can be cast, extruded or otherwise fabricated to provide hollow fibers by dry or wet spinning techniques are included. Typical polymers suitable for use in the process of the present invention can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylylene oxide); poly(esteramidediisocyanate); polyurethanes; polyesters (including polyarylates), such as poly(ethylene terephthalate), poly(alkyl methacrylates), poly(alkyl acrylates), poly(phenylene terephthalate), etc.; polysulfides; polymers from monomers having alphaolefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters), such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amines), poly(vinyl phosphates), and poly(vinyl sulfates); polyallyls; poly(benzobenzimidazole), polyhydrazides; polyoxadiazoles; polytriazoles; poly(benzimidazole); polycarbodiimides; polyphosphazines, etc., and interpolymers, including block interpolymers containing repeating units from the above such as terpolymers of acrylonitrile-vinyl bromide-sodium salt of parasulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups, monocyclic aryl; lower acyl groups and the like.

Furthermore, since the organic polymer is to be treated to remove it in subsequent steps of the process, it should be amenable to this treatment. For instance, a more preferred polymer would be one that readily decomposes and/or reacts, but not at an excessively rapid rate to effect its removal. Still further, such polymers should not form reaction products that will adversely interact with the inorganic materials or interfere with the subsequent steps in the process.

Obviously, the cheapest and most readily available polymers are preferred. Polymers and polymers of acrylonitrile with one or more monomers polymerizable therewith are particularly useful in the process of this invention.

The solvents used in the preparation of the polymer solution can be any number of those well known to those skilled in the art. For instance, such solvents as dimethylacetamide, dimethylformamide, dimethyl sulfoxide, etc., are particularly useful with such polymers of acrylonitrile. Obviously the solvent selected should be a good solvent for the organic polymer and should be amenable to the dry or wet spinning techniques contemplated in the subsequent steps of the process.

The polymer solution containing an inorganic material can be prepared by dispersing the inorganic material in the solvent followed by the addition and dissolution of the polymer in the solvent. Any other suitable means of preparing the polymer solution containing an inorganic material is acceptable, for instance, by concurrently mixing polymer, inorganic material and solvent or by mixing the polymer and the solvent followed by addition and dispersion of the inorganic material, etc. It is preferred to disperse the inorganic material in the solvent prior to polymer addition.

Ambient or somewhat higher temperatures are usually quite adequate for the preparation of the polymer solution containing an inorganic material. Dependent on polymer, solvent and/or inorganic material utilized, higher or lower temperatures may aid the preparation but are not considered critical.

The amount of the inorganic material is inversely related to the same general considerations discussed above concerning the polymer concentration in the polymer solution. The maximum amount is limited to that where the precursor fiber structure can not be maintained because sufficient polymer is not present. The minimum amount is where the inorganic material particles are so widely dispersed that they do not sufficiently fuse or bond during sintering. Normal ratios, by weight, of inorganic material to polymer will range from about 3.5 to about 15. Preferred ratios of inorganic material to polymer are from about 4 to 12, more preferably from about 4.5 to 10.

The inorganic material must be uniformly dispersed as, e.g., small particles, throughout the polymer solution. Sufficient mixing must be carried out to achieve such a uniform dispersion. Although some amount of inorganic material may be dissolved, and this may be helpful in achieving a uniform dispersion, this is not critical to achieving the objectives of the present invention.

The inorganic material incorporated into the polymer solution is a sinterable inorganic material (this phrase includes materials from which a sinterable material can be prepared). Such materials constitute an extraordinarily large group of materials that either are suitable as such or that can be converted to the desired sinterable inorganic material. For instance, if the desired fiber is to comprise a metal, such as nickel or its alloy, either the metal, its oxide or other compounds that can be ultimately converted to such metals can be used.

Although the process of the present invention is particularly useful in producing hollow fibers of metals, such as by the reduction of metal oxides to elemental metal and sintering of the metal, it may be utilized to produce hollow fibers of any inorganic materials that are sinterable (or that can be converted to a sinterable material). Such inorganic materials are discussed above. For purposes of illustration, the following detailed description will be limited to metal compounds which are reducible to metals which are sinterable.

Since the reduction temperatures must, of course, be below the melting and vaporization point of the compounds being reduced and of the elemental metal formed, the metal compounds which vaporize or sublime excessively at temperatures below that at which they will react with hydrogen or carbon, the metal component of which has such a low temperature of vaporization of sublimation (e.g. K, Na, Li, etc.), may not be satisfactorily used in accordance with the present process without special considerations. (Although the use of hydrogen to provide the environment for reducing the metal compound particles to elemental metal is a preferred embodiment of the present invention, other reducing materials may be employed. For example, the metal compounds and particularly nickel and iron oxides can be reduced by partially or wholly substituting carbon monoxide for the hydrogen reducing environment. Obviously the constituents of the polymer and traces of solvent will also contribute to such a reducing environment.)

Additionally the metal compound itself is limited to those materials wherein the reaction products, other than the elemental metal, will leave the reaction zone prior to or during sintering of the hollow fiber.

The most significant metal compounds are, of course, the oxides since these compounds are the most plentiful; and, in fact, are the state in which metals are most commonly found as by-products of manufacturing and in natural ore concentrates. Other compounds which may be utilized include metal halides, hydroxides, carbonates, oxalates, acetates, etc.

Particle size is an important factor for producing the desired hollow fibers regardless of the inorganic material utilized. Small particles utilized for dispersion in the polymer solution usually range in size from less than 15 microns, preferably 10 microns, most preferably 5 or less microns. Generally mixtures of such particles will range in size distribution from one end of the scale to the other. Obviously, the smaller particle sizes are preferred in order to obtain a more uniform dispersion. To obtain metal fibers of desired characteristics it may be necessary to use very small particles, i.e., 1 micron or less. This may require particle size comminution and/or classification to achieve desired sizes.

In the application of the reduction and sintering techniques to hydrogen reducible compacted metal compounds such as metal oxides, carbides, etc., other workers have found that the resulting sintering articles exhibit microscopic cracks and fissures and a generally poor surface. This was thought to be due to "outgassing" of vaporized or sublimed elements of reaction or the compacting aids. The cracks and fissures did not heal during the subsequent sintering step and the poor surface condition persisted. This "outgassing" problem is not observed with the process of this invention.

A generally smaller diameter particle would be expected to intensify "outgassing" cracking and surface problems since the smaller particles are closer together leaving less room for the evolved reaction products, i.e., gases to escape. However, it has been found that where the smaller particles are utilized a more flaw-free essentially nonporous compact layer can be produced. A porous characteristic is, for all intents and purposes, essentially nonexistent where the process is applied to produce a skin at the hollow fiber surface using particles under about 1 micron in size.

A still further difficulty in using very fine metal particles relates to the tendency of many metals to oxidize when exposed to air in small particle form. For example, fine iron particles (40 microns or less) tend to react exothermically when exposed to air to form iron oxide particles. Thus, it is difficult to handle such materials while the oxide particles can be freely shipped and easily handled without providing air tight protective envelopes or making special provisions to avoid spontaneous reactions. The process of this invention is particularly amenable to use of oxides since oxide particles are often by-products of metal treating, and, consequently, are readily available at low prices. For example, iron oxide particles obtained as a by-product from hydrochloric acid pickling is readily available. Other sources of iron oxide particles include dust from basic oxygen converters, rust, mill scale, and high-grade iron ore. Nickel oxide is available at nominal prices.

Metal compound particles of any general shape (i.e., spherical, oblong, needles, or rods, etc.) may be employed in accordance with the present invention. Metal oxide particles obtained by the process of spray drying a dissolved metal compound can provide superior hollow fibers.

Accurate particle size determinations of small particles are difficult to obtain, particularly where the particle size includes particles less than 10 microns in diameter (or smallest dimension). Such determinations are most difficult where the particles are of non-uniform shape. For example, many of the particles are likely to be of a relatively elongated configuration so that it is difficult to determine the smallest dimension of the particle. Elongated particles will not pass through a screen having a mesh that is designed to accommodate a relatively symmetrically shaped particle of equivalent mass. As a result particle size and particle size distribution measurements vary to a considerable degree for a given material between the known methods and procedures for making such determinations.

Relatively accurate small particle size determinations may be made through the use of the Coulter counter procedure. In this procedure the particles are suspended in an electrically conductive liquid and are caused to flow through a small orifice. A current is caused to flow through the orifice by means of two immersed electrodes, one on each side of the orifice. As the particles flow through the orifice, the change of electrical resistance between the electrodes is measured to determine particle size. Thus, the measure is primarily interpreted on particle mass and is not affected by shape.

The process of the present invention, when using metal compounds, takes advantage of the "active" state of the metal after reduction of the metal compound particles and prior to sintering. Metal particles tend to acquire a thin oxide coating or film and in fact nearly all metal powders of fine particle size must acquire or be provided with such a film to prevent rapid oxidation or defeat the pyrophoric nature of such materials. Such a film renders the particles "passive" so that they may be handled in ordinary atmosphere. However, such a film is difficult to reduce and retards sintering. When metal compound particles are reduced in accordance with the process of the present invention to elemental metal and such metals are sintered subsequent to reduction without being exposed to an oxidizing environment, hollow fibers of this invention having excellent properties are obtained.

Metal alloys can be provided as the inorganic material of the fiber of this invention by the simple expedient of mixing particles of metal compounds, e.g., metal oxides, and dispersing this mixture in the polymer solution. Such alloys can provide useful characteristics of strength, diffusivity and chemical resistivity. Exemplary of such alloys are those formed using nickel and iron oxides.

Another acceptable procedure for making metal hollow fibers by the practice of the process of the present invention is to incorporate metal particles with the particulate metal compounds. Preferably the metal particles will be blended with the metal compounds prior to dispersion in the polymer solution. Reducing and sintering may be accomplished at the usual temperatures and in the presence of the usual atmospheres (in accordance with the process of the present invention). The sintering temperature may be high enough to effect diffusion of the elemental metal into the reduced base metal to effect alloying. Consequently, it may be necessary or desirable to employ a somewhat higher sintering temperature where the elemental metal has a low diffusion rate. If the sintering temperature of the elemental metal (or temperature at which diffusion of the elemental metal into the base metal will occur) is higher than the melting point of the base metal then alloying may not be accomplished. However, in the latter eventuality the elemental metal or its oxide may dispersion strengthen the base metal.

An additional use of metal particles is to reduce shrinkage of the sintered fiber. In any sintering process, the metal article shrinks in its outer dimensions due to the elimination of the void spaces between the particles when the particles fuse to form a solid mass. When the inorganic material comprises metal compounds such as metal oxides that are first reduced and then sintered in accordance with the method of the present invention such shrinkage is accentuated due to the fact that the reduced particles are smaller than the metal compound particles and thus should provide greater void spaces between particles. Such shrinkage can be reduced or minimized by adding elemental metal particles to the metal compound particles for incorporation in the polymer solutions. For example, it may be desirable to add up to 50%, by weight, nickel particles to nickel oxide particles to reduce shrinkage of the resultant hollow fiber. The particle size of the elemental metal particles will preferably be very small since such dispersed particles will diffuse into a matrix metal quickly and evenly.

Further, by including with the metal compound a proportion of dispersed, non-reducible (or diffusible) materials of controlled particle size, it is possible to effect a dispersion strengthened sintered fiber. The particles may consist of elemental metals that sinter at a higher temperature than the sintered material of the fiber.

As mentioned above, the sinterable inorganic material can be a material that comprises the fiber material without chemical modification or a material that is converted to a desired form by chemical modification. As extensively discussed above, metal compounds particularly metal oxides to be reduced to elemental metals, are illustrative of the latter materials. If metal fibers are desired these oxides require reduction to the elemental metal prior to or during sintering. Other materials that are amenable to the process of the present invention are those that may require oxidation or both oxidation and reduction to form the material comprising the final hollow fiber. Although these procedures will not be discussed in the detail provided for metal compounds, those materials which may be oxidized prior to sintering, such as aluminum, are also useful with the process of this invention. Other inorganic materials which can be provided by simultaneous oxidation and reduction are also useful in the process of this invention. Illustrative of these materials is the simultaneous oxidation and reduction of aluminum or titanium and iron oxide or nickel oxide. The following materials illustrate those materials which can form the final fibers without chemical modification (i.e., without reduction and/or oxidation), are metals, ceramics such as alumina, $\beta$-alumina, glass, mullite, silica, etc.

The polymer solution containing an inorganic material can also contain other additives to assist in this and subsequent steps in the process, particularly for instance, in the extrusion and fiber-forming steps. Wetting agents such as sorbitan monopalmitate, etc. are useful to wet the inorganic material by the solvent of the polymer solution. Plasticizers such as N,N-dimethyl lauramide, etc. are useful to provide polymeric precursor fiber flexibility.

EXTRUSION OF POLYMER SOLUTION CONTAINING INORGANIC MATERIAL

In making hollow fibers of the present invention, a wide variety of extrusion conditions may be employed. As previously discussed, the weight percent polymer in the solution may vary widely but is sufficient to provide a hollow fiber under the extrusion and fiber-forming conditions. If the inorganic material, polymer and/or solvent contain contaminants, such as water, particulates, etc., the amount of contaminants should be sufficiently low to permit extrusion and/or not interfere with or adversely affect subsequent steps in the process or the final fiber. If necessary, contaminants can be removed from the polymer solution by filtration procedures. Obviously filtration must be appropriate to remove contaminant particles while passing the particles of inorganic material. Such filtration may also remove particles of inorganic material which are above the desired particle size. The presence of excessive amounts of gas in the polymer solution containing inorganic material may result in the formation of large voids and undesirable formation of porosity in the polymeric precursor hollow fiber. Accordingly, degassing procedures are also appropriate. Such degassing and/or filtration procedures can be carried out immediately after or during preparation of the polymer solution containing an inorganic material or can be carried out immediately prior to or during the extrusion step.

The size of the hollow fiber spinnerets will vary with the desired inside and outside diameters of the resultant polymeric precursor hollow fiber. The spinnerets may also vary in shape, i.e., hexagonal, oblong, star, etc. The spinnerets are generally circular in shape and may have outer diameters of, for instance, about 75 to about 6000 microns with center pin O.D. of about 50 to about 5900 microns with an injection capillary within the center pin. The diameter of injection capillary may vary within the limits established by the pin. The polymer solution containing the inorganic material is frequently maitained under a substantially inert atmosphere to prevent contamination and/or coagulation of the polymer prior to extrusion and to avoid undue fire risks with volatile and flammable solvents. A convenient atmosphere is dry nitrogen.

The temperature preparatory for extrusion of the polymer solution containing inorganic material can vary over a wide range. In general the temperature is sufficient to prevent undesirable coagulation or precipitation prior to extrusion. The temperature generally can range from about 15° C. to about 100° C. preferably from about 20° C. to about 75° C.

The pressure to accomplish the extrusion is normally those within the ranges understood by those skilled in the fiber spinning arts. The pressure depends on, for instance, the desired extrusion rates, the spinneret orifice size and the viscosity of the polymer solution containing the inorganic material. Of particular note is the fact that relatively low pressures can be utilized with the process of the present invention. This contrasts with compaction procedures which often require hundreds of atmospheres of pressure to provide compacted and sintered articles. The pressures useful with the present invention normally range from about 1 atmosphere up to about 5 atmospheres or higher.

Obviously the fibers can be extruded through a plurality of spinnerets. This will enable the concurrent formation of multiple fibers while, for instance, using the same coagulating bath. The use of a plurality of spinnerets can also enable the twisting together of the precursor fibers during or subsequent to formation. This provides a particularly unique ability to provide multiple fiber cords that are particularly suited for good fluid distribution to the outer fiber wall diffusion surfaces when joined in bundles of many fibers. Such twisted fibers are particularly useful in achieving desirable packing factors when assembling the cords in a bundle and result in excellent distribution of fluids therein. This contrasts with bundles of relatively straight fibers which generally may not exhibit such desirable fluid distribution patterns.

FORMATION OF THE POLYMERIC PRECURSOR HOLLOW FIBER

In general, fiber-forming spinning techniques are known to those skilled in the synthetic fiber-forming industries. These skills can be advantageously applied to the fiber-forming step of the process of this invention. Likewise, procedures have been developed to form polymeric hollow fibers having radially anisotropic internal void volume wall structures. Such procedures can also be readily adapted to the fiber-forming step of the instant invention. These latter procedures are exemplified by the following patents which are hereby incorporated by reference: U.S. Pat. Nos. 3,674,628, 3,724,672, 3,884,754 and 4,055,696. The fiber-forming step may be conducted using wet or dry spinning techniques, i.e., the spinneret may be in or removed from the coagulating bath. The wet technique is often preferred and may be used for the sake of convenience.

The coagulation can be effected by bringing the fiber which is being formed into contact with a coagulating bath. In the case of the peripheral external zone it suffices to pass the fiber which is being formed into the coagulating bath. The peripheral internal zone can be subjected to coagulation by injecting a fluid (which coagulates the polymer in the polymer solution) into the bore of the fiber being formed. The fluid may comprise, e.g., air, isopropanol, water, or the like. The size of the polymeric precursor hollow fiber can be increased by an increased flow of the fluid injected into the bore.

Any essentially non-solvent for the polymer can be employed as the coagulating agent in the coagulating bath. The coagulating agent is normally miscible with the solvent of the polymer solution. The nature of the coagulating agent selected depends on the solvents used for the polymer and the choice depends on criteria known in the field of fiber spinning. By a "powerful coagulating agent" is meant a medium in which the polymer will rapidly precipitate. By a "mild coagulating agent" is meant a medium in which the polymer will precipitate slowly. Conveniently, water is employed as the primary coagulating agent in the coagulating bath. Other coagulating agents are ethylene glycol, polyethylene glycol, propylene glycol, methanol, ethanol and propanol, etc. The residence time for the extruded fiber in the coagulating bath is at least sufficient to ensure reasonable solidification of the fiber. The peripheral external zone is formed due to interaction with the coagulating agent and/or cooling. (Cooling may also be achieved by bringing the extruded polymer solution containing inorganic material into contact with a gas at a temperature below the gelling temperature of the polymer solution. Where gelling is accomplished in this manner, the cooling gas can be subjected to a relatively rapid translatory movement which can be oriented in a direction parallel to that of the hollow fiber. This gas may additionally be charged with water vapor or the vapor of some other nonsolvent.) The setting of the peripheral internal zone can be achieved in a similar manner by interaction with a coagulating agent in the injected fluid and/or by cooling due to the temperature of the injected fluid. Where gelling is also accomplished in the coagulating bath the bath may, in addition to its gelling effect, also impart a coagulating effect.

The temperature of the coagulating bath may also vary widely, e.g., from −15° to 95° C. or more, and is most often about 1° to 35° C., say, about 2° to 25° C. The temperature of the fluid injected into the bore can be from about −15° to about 95° C. preferably about 1° to about 35° C.

In forming the polymeric precursor hollow fibers of this invention the radially anisotropic internal void volume wall structure can be realized by using different temperatures and compositions of the coagulating bath and the fluid injected into the bore. For instance, to achieve high internal void volume the coagulating agent in either the coagulating bath (for the peripheral external zone) or the fluid injected into the bore (for the peripheral internal zone) should be a powerful coagulating agent or should have a higher concentration of a coagulating agent. To achieve lower internal void volumes mild coagulating agents can be utilized. Different temperatures can also effect rate of coagulation.

The wall structure can also be varied by, for instance, pumping rate for a given take-up speed, the amount of fluid injected into the bore, the degree of stretching, etc. A compact layer at the external surface of the fiber wall can be obtained by, for instance, using a very mild coagualting agent (or low concentration) in the coagulating bath. A compact layer at the internal surface of the fiber wall can be obtained by, for instance, using a very mild coagulating agent (or low concentration) in the fluid injected into the bore. A compact layer within the fiber wall can be obtained by, for instance, using a very powerful coagulating agent in both the coagulating bath and fluid injected into bore.

The process of this invention provides particularly desirable anisotropic hollow fibers that have an essentially non-porous compact layer. Such layers are present as internal and/or external skins or are within the fiber wall. The essentially non-porous compact layer can usually be achieved by the procedures described above.

After coagulating the fiber it may be washed to remove solvent by, for instance, washing with the coagulating bath solution or with other non-solvents that are miscible with the solvent of the polymer solution. The precursor hollow fiber may also be stored in a water or other liquid bath.

The extrusion and fiber-forming conditions are preferably such that the fiber is not unduly stretched. Although not necessary, stretching can be used, say about 1 to about 5 fold. Frequently, extrusion and fiber-forming speeds are within the range of about 5 to 100 meters per minute although higher speeds can be employed providing the fiber is not unduly stretched and sufficient residence time is provided in the coagulating bath. Stretching generally strengthens the polymeric precursor hollow fiber. Stretching also allows increased linear productivity and smaller fiber diameters with a given spinneret.

An annealing procedure may also be carried out to toughen the polymeric precursor hollow fiber. Both the stretching and annealing procedures can be conducted by, for instance, passing the fiber through boiling water.

Another important consideration, but not a limitation, on hollow fiber wall structure is the presence of a compact layer having a minimum of "flaws". (This term when used in the present context refers to imperfections in the compact layer through which, under normal operating conditions, the passage of both desirable and undesirable fluids is allowed without the desired discrimination.) The upper limit on flaws is a matter of compromise in each system for a number of reasons. Some systems by reason of economics require a very high selectivity while others may require only moderate selectivity to be competitive with other separation techniques. Thus, generally, while precautions in hollow fiber production and handling should be taken to minimize flaws, the acceptable number and sizes of flaws will vary depending on the application of the fiber.

The precursor hollow fibers of polymer laden with an inorganic material can be subjected to the subsequent steps in the process or can be taken up and stored in precursor monofilament form, or as twisted cords, on, for instance, bobbins. The precursor fibers are flexible and have a reasonable degree of strength and can therefore be handled without undue concern for damage.

After obtaining the precursor fiber by the process of this invention, drying can be carried out in a known manner. The fibers are generally, but not necessarily, dried prior to treatment to remove the organic polymer. The drying may be conducted at about 0° to 90° C., conveniently about room temperature, e.g., about 15° to 35° C., and at about 5 to 95, conveniently about 40 to 60, percent relative humidity.

The precursor fiber comprises the polymer in minor amount acting as the continuous phase carrier for the inorganic material which is uniformly dispersed throughout the polymer. Generally, the polymer is present in the precursor fiber in concentrations substantially less than 50% and often as low as 25%, 15 or as low as about 5% by weight. The major component in the precursor fiber being, of course, the inorganic material. Other materials may be present in the precursor fiber but generally only in small amounts.

FIG. 1 shows a polymeric precursor hollow fiber prepared by the foregoing procedure.

TREATMENT TO REMOVE ORGANIC POLYMER

After formation of the polymeric precursor hollow fibers laden with inorganic material the fiber can preferably be dried or dried and stored as discussed above, or transferred directly to a treatment to remove the organic polymer from the fiber. This can be accomplished by heating to decompose and/or react the organic polymer. This may be accomplished in an inert or reducing atmosphere to aid in reduction of the inorganic material, although this is not always necessary. As mentioned above, the reaction products formed from the organic polymer may serve to enhance the other steps of the process. For instance, the hydrogen and carbon present in the polymer serve as an excellent source of a reducing environment. This environment helps to reduce metal compounds, e.g., oxides, to the elemental metal.

The fiber containing inorganic material may, optionally, be subjected to reduction and/or oxidation. (It is, of course, recognized that neither reduction or oxidation may be necessary if the inorganic material dispersed into the polymer solution is in the chemical form desired for sintering.) Preferably an appropriate atmosphere will be provided just prior to the fiber being subjected to the reduction and/or oxidation temperature. For instance, with reduction, this may be accomplished by continuously passing the polymeric precursor hollow fiber laden with a reducible inorganic material through a commercially available oven. An atmosphere comprising, for instance, hydrogen may be caused to flow countercurrently and in contact therewith. As the fiber first contacts the heat of the oven, the remaining volatile components will outgas. As the temperature approaches reducing temperatures, the reducible inorganic material, for instance, metal compounds, are reduced, for instance, to elemental metal, and the reaction products outgas.

For the purposes of the present invention and this specification, it will be understood that the temperature range at which polymer removal and reduction and/or oxidation will occur and the sintering temperatures may overlap to some extent. In other words, some sintering may occur at the temperatures at which polymer removal and reduction and/or oxidation is carried out, although it is preferable that the temperature be such that reduction takes place immediately preceding sintering. The preferred temperatures at which reducible inorganic materials, i.e., metal compounds, will reduce are well-known to those skilled in the art or their determination is well within the skill of those of ordinary competency.

The preferred reducing environment may be provided by any atmosphere which provides a source of hydrogen. For example, such an atmosphere may comprise hydrogen, cracked hydrocarbons, dissociated ammonia, combinations of each, combinations of one or more of such gases and other gases or vapors which will not materially interfere with the reduction reaction. The reaction produces from the decomposition and/or oxidizing of the polymer are valuable aids in providing the reducing atmosphere.

Solid reducing materials, carbon for example, may be employed in combination with the hydrogen yielding gas only where the reactants (e.g., CO and $CO_2$) appropriately "outgas" and will not leave residual elements in the sintered fiber that will interfere with the desired fiber properties. For example, carbon may be a desired addition to the oxide powder. Carbon may also be employed where the ultimate product is carbide-containing, e.g., a steel composition where the residual carbon is a necessary element for the final fiber.

Oxidation of the inorganic material can be conducted at the appropriate temperatures under suitable pressures and atmospheres. Air is the preferred atmosphere. The oxidation temperatures are generally well-known or readily ascertainable. Simultaneous oxidation and reduction can occur, say, for instance, in the formation of cermets.

The resulting fiber comprising a sinterable inorganic material may then be conducted directly into a sintering zone.

SINTERING TO FORM TO INORGANIC FIBER

The term "sintering" is meant to include an agglomeration by fusion and bonding of the sinterable inorganic material to at least that point at which the particulate material forms a monolithic structure. Sintering should provide a fiber having substantial strength as compared to a fiber which has undergone the previous steps and has not been sintered. The sintering must be conducted under conditions that assure that the valence state desired is achieved or maintained under sufficient temperatures and times to allow the fusion and bonding to occur.

In the production of the hollow fibers of this invention there are little or no limitations on the heating rate for sintering. For instance, the sintering of a nickel-iron alloy fiber can be from about 950° C. to about 1200° C. for from 15 to 5 minutes, respectively. A nickel-iron alloy fiber produced under these conditions is excellent. In general, similar to the reduction and oxidation temperatures, the preferred sintering temperatures of the inorganic materials are well-known or readily ascertainable.

During the organic polymer removal, optional reduction and/or oxidation of the inorganic material and sintering steps, suitable conditions must be maintained to avoid damage or destruction to the fiber wall structure and integrity. A shrinkage ratio (final fiber to precursor fiber) of from about 0.2 to about 0.9 can be expected, usually 0.3 to 0.6. That is, the precursor hollow fiber is often transformed to the final hollow fiber with substantial size reduction. This is expected during these process steps. For instance, the fiber is substantially reduced in length and the fiber outer diameter, wall structure and compact layer, although remaining in relative relationships, are also reduced in size. During these steps means must be provided to handle the fiber as it shrinks. Particularly critical is the point immediately prior to sintering where the fiber is fairly fragile. At this point, particular care must be taken to provide means to afford such shrinkage without damage to the fiber. For instance, if the fiber is allowed to adhere to a conveying surface at this point it may break as it shrinks. One method of handling the fiber at this point is to feed a precursor fiber or a cord of precursor fiber, which may be pretreated, to provide better handling characteristics, into the furnace by means of a conveyor belt which is fabricated of material which does not adhere to the fiber under the operating conditions of the furnace. This conveyor belt can be transporting the fiber at the speed of the final fiber as it exits the furnace. The precursor fiber feed speed is faster than the final fiber speed. The precursor feed speed can be adjusted to account for the shrinkage that occurs.

Figure 6:
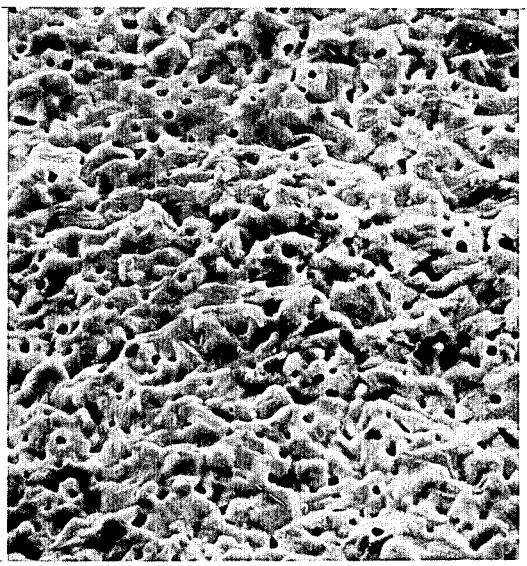
FIG. 6 shows a photomicrograph of the external surface of a hollow fiber of this invention showing a skin that is uniformly porous.

Those fibers having a compact layer can be treated to obtain a porous compact layer by, for instance, treating the compact layer with a fluid that has some interaction with the material of the compact layer to produce a porous compact layer. For instance, a polymeric precursor fiber containing nickel oxide and a compact layer can result in a uniformly porous surface by introducing ammonia gas in the atmosphere in the furnace. The photomicrograph shown in FIG. 6 illustrates such a uniformly porous compact layer.

An alternate means to obtain a porous compact layer is to introduce a relatively small amount of fine particulate material which does not participate in the sintering or participates in the sintering to a lesser degree. Incorporation of such fine particulate materials in the polymer solution containing an inorganic material during its preparation has resulted in a porous compact layer in the final inorganic fiber.

A particularly important feature of the process of this invention is the ability to produce fibers having essentially non-porous compact layers with ease. This feature is surprising since the polymer of the polymeric precursor fiber is the continuous phase which is removed as discussed above. It has been found that, although the polymer is removed from the compact layer of a precursor fiber, the final fiber, after sintering, is usually essentially non-porous. Although it might be expected that shrinkage and reduction of interstices between particles of inorganic materials might occur when the inorganic material undergoes reduction, oxidation and/or sintering, the formation of a compact layer that is essentially non-porous, i.e., allows passage of fluids, e.g., gas, essentially only by diffusion, is both desirable and unexpected. This phenomena appears to occur throughout the fiber wall structure whereever polymer is removed. It has been observed particularly when using metal compounds, e.g., oxides, to convert to elemental metal.

The essentially inorganic, monolithic hollow fiber having a radially anisotropic internal void volume wall structure resulting from the foregoing process is strong compared to precursor fiber and fibers from the intervening steps. The final fibers may be flexible enough to be stored on bobbins but are not as flexible as the precursor fibers. The final fibers can be cut into desired lengths for assembly into, for instance, bundles having a multiplicity of fibers (which may also be in cords of twisted fibers). Usual lengths range from about 0.2 to about 10 meters, preferably about 1 to about 5 meters. The size of the bundles is dependent on the application intended but can generally range from about 0.5 to about 25 cm in diameter. Likewise, the devices utilizing the fiber bundles can contain multiple bundles. Procedures for constructing such devices are known to those skilled in the art. See, for instance, U.S. Pat. No. 2,961,062 which is hereby incorporated by reference.

METAL RADIALLY ANISOTROPIC INTERNAL VOID VOLUME HOLLOW FIBER

A metal hollow fiber and process to produce it that are preferred embodiments of the present invention are described below. This metal anisotropic hollow fiber has an essentially non-porous thin skin at its external surface.

The organic polymer solution can comprise, for instance, an acrylonitrile homopolymer or polymers of acrylonitrile with one or more monomers polymerizable therewith dissolved in an organic solvent such as dimethylacetamide, dimethylformamide, etc. Generally the concentration of polymer in the solution can be from about 5 to about 35 preferably from about 10 to about 30% by weight of the polymer solution. The metals comprising the fibers can preferably be provided by, for instance, dispersing small particles of metal compounds, e.g., oxides of the metal, into the polymer solution. Preferred metals are those metal alloys, such as nickel-iron alloys, which can be obtained by mixing small particles of oxides of the metals desired, for instance nickel and iron oxides. Generally, any such metal oxide mixture may contain a predominant amount of one metal oxide, e.g., nickel, at say from about 65 to about 99% by weight of the metal oxide with say, from about 35 to 1% of another metal oxide, e.g., iron oxide. The small particles of the metal compound are preferably mixed with the solvent prior to addition of the polymer. This may be of particular advantage if a particle size reduction is contemplated during such mixing. The amount of metal compound can generally range from a weight ratio of metal compound to polymer of about 3.5 to about 15, preferably from about 4 to about 12, more preferably 4.5 to 10. The mixture might also contain small amounts of other materials. For instance, wetting agents may be particularly useful in achieving the desired uniform dispersion of the metal compound throughout the polymer solution. The temperature utilized during the mixing is not particularly significant except to the extent that a sufficiently high temperature should be maintained to form the desired polymer solution containing a uniform dispersion of the metal compound.

During or subsequent to the formation of the polymer solution containing the metal compound(s) it is preferred to utilize particulate removal, e.g., filtering and/or degassing procedures to remove undesirable solid particles (which may also include excessive sized metal compound particles) and/or undesirable gases.

The polymer solution containing the metal compound can then be extruded through a hollow fiber spinneret having, for instance, an outer diameter of from about 75 to about 6000 microns, preferably from about 200 to about 1000 microns and center pin O.D. of from about 50 to about 5900, preferably from about 50 to about 900 microns. The center pin can also have an injection capillary.

The fiber being extruded from the spinneret orifice is then, preferably, immediately contacted (as in wet spinning) with a coagulating bath. The coagulating bath should contain a non-solvent, e.g., water, for the polymer and, usually, may also contain the solvent of the polymer solution. When homopolymers or polymers of acrylonitrile with monomers polymerizable therewith are used as the polymer it has been found to be particularly advantageous to use water as a coagulating agent both in the coagulating bath and the fluid injected into the bore of the fiber being extruded. The coagulating agent concentration in the coagulating bath is dependent on the desired rate of coagulation. The rate of coagulation is also temperature dependent. It is generally necessary to have a coagulating agent, for instance water, concentration of from about 20 to about 100%, preferably about 35 to about 100%, by volume, of the coagulating bath. A temperature of the coagulating bath below the temperature of the mixture being extruded is often advantageous. The concentration of the coagulating agent (which may be the same or different from the coagulating agent in the coagulating bath) in the fluid injected into the bore of the extruded fiber is also dependent on the fiber characteristics desired. Usually a higher concentration of a powerful coagulating agent in the injection fluid is acceptable where a higher internal void volume in the peripheral internal zone is desired. Often water is quite acceptable as the injection fluid.

The precursor hollow fiber can then be passed from the coagulating bath to a stretching procedure, say from about 1 to 5 fold in a suitable medium, for instance, boiling water. (A washing procedure may be utilized after the coagulating bath in lieu of longer residence times in the bath.) The fiber can also be subjected to a relaxing (annealing) procedure which also can be carried out, for instance, in boiling water. The relaxing may be from about 0.6 to about 0.9 ratio. Neither the stretching or relaxing procedures are critical although they do provide a stronger and tougher precursor fiber.

The resulting precursor hollow fiber comprises the polymer laden with the metal compound(s) and having a radially anisotropic internal void volume wall structure. It preferably has a compact layer, e.g., skin, at its external surface. The polymer concentration in the precursor fiber can generally be relatively low, say from about 25% to 5%, preferably from about 15% to about 5% by weight of the precursor fiber with the other major component being the metal compound(s). There may also be small amounts of other materials present, i.e., traces of other solvents, coagulating agents, wetting agents and minor contaminants, etc.

The precursor fiber can be dried at this stage, and this can usually be accomplished by air drying. The production rate of the precursor fiber is generally from about 5 to about 100, preferably 35 to 65, meters per minute.

It is also a preferred procedure to twist a plurality, i.e., 2 or more, of precursor hollow fibers into a cord which will maintain this configuration after the subsequent steps to convert the precursor fiber to a metal fiber. Such cords of metal fibers are particularly useful to provide desired distribution patterns and packing factors when the cords are used in bundles for separation devices. Handling such fibers in cord form is also useful to improve production rates.

The precursor hollow fiber is preferably subjected to those temperatures and atmospheres that will decompose and/or react the polymer, reduce the metal compound to elemental metal and sinter the resultant metal particles to from the final fiber. The reducing environment utilized may be provided, at least in part, by the reaction products from the polymer as it decomposes or oxidizes. (The metal compounds, e.g., oxides, act here as oxidizing reactants as they reduce.) Other inert or reducing gases, such as nitrogen, hydrogen and/or carbon monoxide, can be introduced, preferably in countercurrent fashion, to maintain the desired reducing atmospheres.

The metal hollow fiber can usually be taken up on a bobbin for storage for future use or can be directed to other procedures to incorporate the fibers into devices for their use. Particularly preferred fibers are those of nickel alloy having an outer diameter of up to about 600 microns, preferably up to about 500 microns, an inner diameter of from about 100 to about 400 microns and a compact layer having a thickness of from 4 to 50 microns.

INORGANIC ANISOTROPIC HOLLOW FIBER APPLICATIONS

As previously noted the inorganic anisotropic hollow fibers of the present invention have numerous fields of application. Since the inorganic material comprising the fiber can be selected from a very large group of materials the fibers are equally diverse in their fields of application. This selection being limited only by the operating environment anticipated for the fiber. To a significant extent the advantages provided derive from the large surface areas available (both within the wall structure and at the internal and external surfaces) and ready access to these surface areas. Illustrative of such fields of application are fluid separations by membrane, filtration, gas sparging, fuel cells, and batteries. Other uses will be readily apparent to those skilled in the art.

A particularly advantageous field of application is fluid separation by membrane. The fibers are useful in this field both with and without a compact layer with the compact layer being either porous or essentially non-porous. For instance, there are numerous fluid separations that can utilize the fibers of this invention that do not have a compact layer or that have a compact layer that is porous. These types of fibers can act as excellent supports for both inorganic and polymeric separation membranes.

The fibers useful as supports for inorganic or polymeric membranes may have uniformly porous compact layers at the surface contacting the membrane. Porosity can also be provided in the fibers of this invention by providing aniostropic internal void volume wall structures without a compact layer having small pores at the support contacting surface. Fibers with a porous compact layer are preferred as supports for such membranes.

The inorganic membranes to be supported by these fibers comprise metals, or other inorganic materials suitable for fluid separation by membrane processes. For instance, palladium, platinum and silver are excellent hydrogen diffusible metal membranes that can be supported by these fibers. Various methods of applying such materials are known to those skilled in the art.

The polymeric membranes to be supported by these fibers are comprised of a wide range of polymeric materials such as polysulfones, cellulose acetates, etc. Those skilled in the art are also well versed in such polymers and methods of application to the fiber surface.

Obviously the inorganic material of the fiber should be of a nature that is satisfactory for use with the pressures, temperatures, and chemical environments in which they are to be employed as supports. These environments can normally be substantially more severe than those where polymeric supports are used.

Such fibers can also be used in filtration processes. For instance, they can be readily adapted for use to remove particulate matter from both liquid and gaseous streams. Furthermore, these fibers can also be provided with porosities suitable for use in ultrafiltration processes.

In general, these fibers can be employed advantageously whenever a large surface area is desired and a variation of void volume is desired as a fluid traverses from one side to the other. For instance, these fibers can be used as a means of providing gas sparging, i.e., dispersion of extremely fine gas bubbles into liquids. Another and similar application is the use of these fibers as porous electrodes for fuel cells. Such fibers can be provided so that the gas side of the electrode has large void volumes with the electrolyte side having extremely fine void volumes. Such porous electrodes are particularly suitable for use in hydrogen/oxygen fuel cells. Fibers with compact layers having uniformly porous surfaces are particularly useful in such applications.

The fibers of this invention that have an essentially non-porous compact layer are particularly useful in gas diffusion processes. For instance, the fibers comprising hydrogen diffusible metals provide excellent hydrogen diffusion barriers which are useful in hydrogen purification, equilibrium reactions, fuel cells as the fuel electrodes, etc. Processes using the fibers of this invention for gas diffusion, particularly those having the compact layer as a skin on an internal or external surface, are preferred embodiments. Such diffusion processes are substantially improved by utilizing the fibers of this invention that have an essentially non-porous compact layer. Although metals are the preferred inorganic material for use in such processes, other inorganic materials can be equally useful in such processes. Particularly preferred processes are those involving hydrogen diffusion.

The effective separation of gases is substantially improved with the gas diffusible hollow fibers of this invention over those obtainable with polymeric hollow membranes. The fibers of this invention can use cheaper materials, e.g., nickel, in lieu of expensive noble metals, e.g., palladium-silver.

By employing the fibers of the present invention in gas diffusion processes, unique advantages in addition to those previously noted are obtained. Thus, extremely pure gas streams are obtained which can be directly employed, for instance, as fuel or feed, in further chemical processing. Other advantages will be described in more detail below. For instance, as previously mentioned a particularly useful process that utilizes the hollow fibers having an essentially non-porous compact layer of this invention are those involving hydrogen diffusion. Hydrogen diffusion devices usually use bundles of fibers which then comprise large surface area diffusion cells useful to selectively separate the hydrogen from hydrogen containing gaseous mixtures at a high rate. Such cells can be prepared by fixedly securing longitudinally in a bundle a multiplicity of anisotropic hollow fibers of this invention having an essentially non-porous compact layer comprised of a hydrogen diffusible metal.

Figure 5:
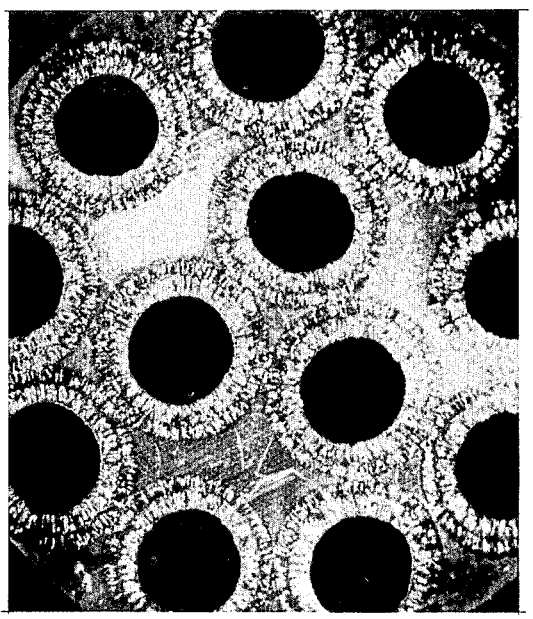
FIG. 5 shows an end view of a small bundle of metal fibers of this invention sealed together inside a sleeve (magnification 50).

The hollow fibers (or cords containing a plurality of twisted fibers) may be cut to a relatively short length so that the pressure drop of the gas flowing through the device is minimized and a high diffusion rate can be maintained. A length of about 0.2 to 10 meters provides good results. The fibers are gathered into a bundle. The fiber ends are usually sealed. A relatively tight fitting retaining sleeve of any suitable metal is placed around the bundle of fibers at one end and molten metal is introduced into the voids between the fibers and sleeve. The molten metal disperses between the exterior walls of the fibers and between the interior wall of the retaining sleeve and the exterior walls of the peripheral fibers. Upon cooling, the molten metal solidifies, following which a portion of the bundle and sleeve is cut transversely of the bundle at a point intermediate the height of the solidified metal sealant whereby the bores can be easily opened by, for instance, polishing and/or other treatments, while the fibers remain sealed to each other and to the retaining sleeve. The bore openings of the fibers are placed in communication with a stainless steel or other suitable conduit for collecting the hydrogen and the fiber are manifolded to the conduit by sealing the sleeve to the conduit by any suitable coupling means. FIG. 5 shows an end view of a small bundle of fibers sealed together. The fibers show the anisotropic internal void volume wall structure characteristic of the fibers of the present invention.

In practicing the instant invention it may or may not be desired that the bores of the fibers in the bundle be open at both ends. If so desired, the sealing and cutting operations previously described can be applied to the bundle at the opposite end. If not, then the bores of the individual fibers of the bundle are permitted to remain closed at their opposite ends. In making diffusion cells having fibers whose bores are closed at one end, it may also be desired to seal the fibers together at this end. If so, the sealing operation described above can be repeated at this end but the bores of the fibers are not cut open.

Figure 7:
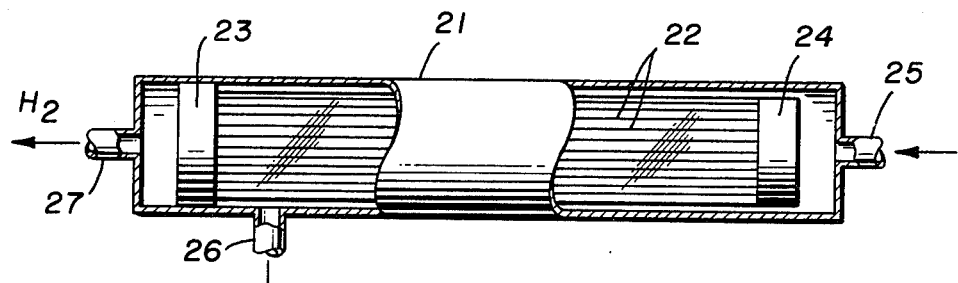
FIG. 7 schematically illustrates a hydrogen diffusion device which contains hollow fibers of this invention.

The hydrogen diffusion device of the instant invention may be utilized in processes where it is desired to separate hydrogen from other gases, to remove hydrogen to shift an equilibrium reaction or to simply provide hydrogen of high purity. With reference to FIG. 7, illustration of such a device, within casing 21 is positioned a multiplicity of hydrogen diffusible hollow fibers of this invention, say about 2000 to 3000, arranged in a bundle generally designated by the numeral 22. One end of the bundle is embedded in header 23 such that the bores of the hollow fiber are in communication through the header. The header is positioned in casing 21 such that essentially the only fluid communication through the header is through the bores of the hollow fibers. The opposite ends of the hollow fibers are sealed in end seal 24. A gaseous mixture containing hydrogen, at an appropriate elevated temperature, enters the casing 21, through feed port 25, disperses within bundle 22 and passes to casing exit port 26 positioned at the opposite end of the casing. Hydrogen diffuses through the fiber walls to the bores of the hollow fibers and passes, via the bores, through header 23. The hydrogen exits casing 21 through hydrogen exit port 27. While FIG. 7 depicts a hollow fiber hydrogen diffusion device in which only one end of the hollow fiber is open, it is apparent that both ends of the hollow fibers can be open.

Particularly preferred processes utilizing the metal anisotropic hollow fibers of the present invention that have an essentially non-porous compact layer are those which require high temperatures and pressures to produce hydrogen. For instance, natural gas (methane), other hydrocarbons or methanol-water reforming processes to generate hydrogen are particularly amenable to employing such fibers. Methanol-water reforming is of particular interest. Nickel and nickel alloys are particularly desirable metals for the hollow fibers useful in such processes. Most preferred processes are those where water vapor is present. Apparently, the presence of water abates the deposition of carbon on the metal surface. Thus, the presence of water can avoid the deleterious effects to the nickel or nickel alloy fiber surface which might otherwise be observed with little or no concentrations of water. Ammonia dissociation is another process amenable to use with such fibers to produce relatively pure hydrogen via hydrogen diffusion. Ammonia, however, appears to deteriorate nickel or some nickel alloy fibers to some extent requiring separate dissociation.

A particularly advantageous feature of the fibers of this invention is their ability to participate in different chemical reactions occurring on opposite sides of the fiber walls. This may be of advantage, for instance, where an endothermic reaction is occurring on one side of the wall to produce hydrogen which can diffuse through the fiber wall essentially non-porous compact layer. The heat to carry out such a reaction and maintain an appropriate temperature could be provided by, for instance, providing an oxygen containing gas, e.g., air, on the opposite side to cause an exothermic oxidation reaction with the hydrogen. Thus complimentary reactions could be occurring on opposite sides of the fiber walls. Such reactions might be even further enhanced by the presence of catalytic materials on the internal wall surfaces or where the material comprising the fiber is itself catalytic to one or more of the desired reactions.

The use of these hollow fibers in equilibrium reactions to shift the equilibrium in a desired direction also involves another form of gas diffusion. In particular, it is effective for reactions which are limited by equilibrium and have a small molecule reaction by-product, e.g., hydrogen. The equilibrium can be effectively shifted in the direction of the product by the removal of this small molecule. By employing the fibers of the present invention, it is possible to operate gas phase reactions at optimum pressures and still obtain a desirable conversion. Likewise it is possible to operate in temperature ranges of less favorable equilibrium constants at which undesirable side reactions may be repressed or entirely eliminated. The processes contemplated further permit the utilization of more economical operating conditions, including by way of illustration, adjustment of reactant concentrations, to obtain improved product yields and conversions as compared to conventional operations under comparable conditions in the absence of gas diffusion. By reducing the small molecule, e.g., hydrogen, concentration in the gaseous mixture undergoing reaction, the overall equilibrium for the particular chemical reaction under consideration will shift toward formation of additional reaction products (including hydrogen); as a result, a more complete conversion of initial reactants to products is obtained than could be realized in the absence of the gas diffusion under similar reaction conditions.

In order to assist in more fully understanding the shifting of equilibrium reaction processes as improved by the fibers of this invention, attention is directed to British Pat. No. 1,039,381 which is hereby incorporated by reference. Such processes are widely practiced on an industrial scale. For example, large quantities of hydrogen are produced by stream reforming of hydrocarbons or methanol, by thermal decomposition of hydrocarbons, by partial oxidation processes employing hydrocarbon feeds, and by the reaction of CO with water (steam). Other known gas-phase reactions, in which hydrogen is one of the products, are practiced commercially, not primarily as a method for the commercial production of hydrogen, but as a result of which product hydrogen (in which case possibly better referred to as "byproduct" hydrogen) is produced. For example, mention can be made here of specific dehydrogenation reactions such as the conversion of cyclohexane to benzene, or of isopentane to isoprene, wherein the desired product is the hydrocarbon, and hydrogen is a by-product. Hydrogenation reactions may also be performed utilizing the fibers of this invention.

Another example of such an equilibrium reaction is the dehydrogenation of ethyl benzene to styrene. This reaction normally takes place at 600° C. with a conversion of about 50%. By removal of the by-product, hydrogen, through the use of hydrogen diffusion through, for instance, a hydrogen diffusible metal hollow fiber of this invention, the reaction can be shifted to effect greater productivity. The hollow fiber, of course, being constructed to withstand the high temperatures.

Still another example of an equilibrium reaction would be the dehydrogenation of propionitrile to acrylonitrile. Propionitrile is a by-product of acrylonitrile manufacture. Normal dehydrogenation techniques at elevated temperatures simply decompose the propionitrile to unwanted products. An effective dehydrogenation, however, can be carried out by homogeneous catalysis using metal complexes at 175° C. Unfortunately, the dehydrogenation is limited to a 1% conversion. By removing hydrogen by hydrogen diffusion using the hollow fibers of this invention, the equilibrium could be shifted favorably to effect increased conversion.

Gaseous phase reactions wherein hydrogen is a product of the reaction are often effected in the presence of homogeneous or heterogeneous catalysts, and the particular reactor employed for the practice of this invention can be provided with catalyst materials. For instance, where hydrogen diffusion is effected within the reactor itself with a solid catalyst, the reaction chamber can be packed with solid catalyst, the hollow fibers being in intimate contact with the catalyst so that hydrogen diffuses therethrough as soon as it is formed. Furthermore, for such reactions it is possible that the inorganic material, i.e., metal, may itself function as a catalyst or catalyst support, which when coupled with the large available surface area within the fiber wall structure provides particularly improved equilibrium reaction processes.

Hydrogen resulting from diffusion as described above is extremely pure. This is particularly desirable.

"Fuel cell" as used herein is a name commonly applied to an electrochemical cell capable of generating electrical energy through electrochemical combustion of a fuel gas with an oxygen-containing gas. These cells have been fully described in the literature. Their precise construction and operation does not form a part of the instant invention except in an incidental capacity. However, a brief description of the nature and construction of a simple fuel cell is believed helpful, if not essential, in understanding the function and importance of the improvement provided by the present invention.

In general, the simplest fuel cell comprises a housing, two electrodes and an electrolyte which acts as an oxygen transferring medium. An oxidizing gas such as air under super-atmospheric pressure is circulated on one side of the oxidizing electrode and a fuel gas, such as hydrogen, under super-atmospheric pressure is circulated on one side of the other electrode. A three-phase interface exists at each electrode, i.e., gas, electrolyte, and solid where a process of adsorption and de-adsorption occurs generating an electrochemical force. When current is drained from the two electrodes there is a net flow of electrons from the fuel gas electrode through an external electrical circuit to the oxidizing gas electrode. Thus, according to the external electron flow convention, the oxidizing gas electrode is the positive electrode and the fuel gas electrode is the negative electrode. Oxygen is consumed at the positive electrode surface and fuel gas is oxidized into products of combustion as electrical energy while the remainder is released as heat.

Figure 8:
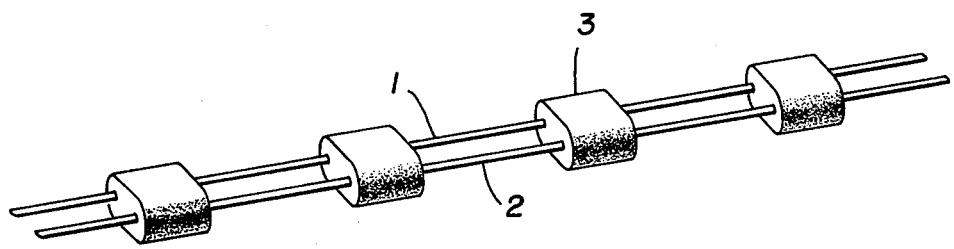
FIG. 8 schematically illustrates a hollow fiber of this invention and silver tubing arranged for use as the electrode elements in a fuel cell.
Figure 9:
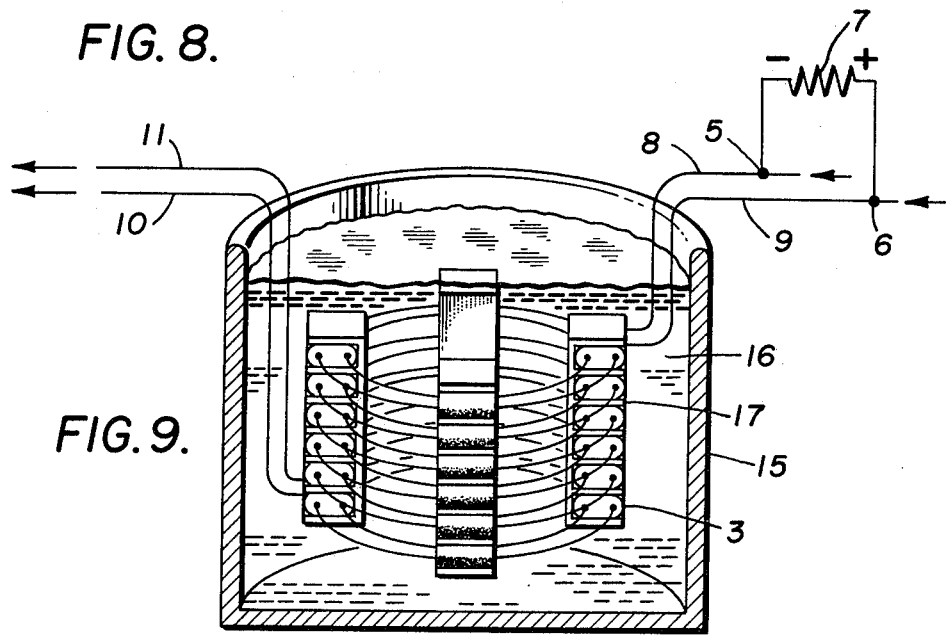
FIG. 9 schematically illustrates, in cutaway fashion, a fuel cell containing the electrode elements illustrated in FIG. 8.

With reference to FIG. 9, illustrative of a fuel cell, within casing 15 is an electrolyte material 16, say a mixture of alkali carbonates, in which is positioned a cylindrically oriented supporting structure 17 which supports the fuel and oxygen electrode element illustrated in FIG. 8.

FIG. 8 illustrates a fuel and oxygen electrode element containing a fuel electrode 1 which can be a hydrogen diffusible hollow fiber of this invention having an essentially non-porous skin, say, nickel-iron alloy, an oxygen electrode 2 which can be, for instance, silver tubing having an outer diameter of about 508 microns and a wall thickness of about 102 microns, maintained in relative arrangement by small ceramic sleeves 3.

Returning to FIG. 9, the fuel and oxygen electrode element is wound in helical fashion around and supported by supporting structure 17 with fuel electrode inlet end 8 and oxygen electrode inlet end 9 displaced from the electrolyte material and provided with a source of hydrogen, e.g., hydrocarbon-water and methanol-water, and a source of oxygen, e.g., air. Exit ends 10 and 11 are also displaced from the electrolyte material and are provided with means for undiffused gases to exit the cell. In operation at elevated temperatures, the fuel gas is fed into inlet end 8 of the hollow fiber. Hydrogen diffuses through the fiber wall and undergoes the anode reaction on the surface side exposed to the electrolyte material 16. With hydrogen forming fuel gases, because of the depletion of hydrogen, more hydrogen will be produced from the fuel gas in the bore of the fiber as it passes through the helical coil. The hollow fiber acts as the anode which can be electrically connected to a negative lead 5. It should be noted that the hydrogen dissociates as it diffuses through the fiber wall. Oxygen bearing gas is fed into inlet end 9 and undergoes reaction at the electrolyte material surface, the tubing acting as the cathode which can be electrically connected to positive lead 6. In the electrolyte material the proton migrates to join the hydroxyl ion to form water which, due to the elevated operating temperature, i.e., 600° C., readily leaves the reaction zone. Current flows through leads 5 and 6 when the cell is operated and the leads are connected through load 7. Some advantages of such a cell are high power and energy density and hydrogen available in an activated form. The hollow fiber acts as its own current collector as does the silver tubing. There is no porosity problem nor is there an undue concentration reduction of voltage. The fiber of, e.g., nickel, is resistant to molten electrolytes. There is no Carnot limitation of energy conversion. The principal operating disadvantage is a requirement to operate at elevated temperatures.

The hollow fibers of the present invention comprising hydrogen diffusible metals and having an essentially non-porous compact layer are particularly useful in such fuel cells.

Workers in the fuel cell field have used both porous and non-porous hydrogen diffusion membranes as the hydrogen, or fuel, electrode. For instance, U.S. Pat. No. 3,092,517 discloses the use of a thin non-porous palladium-silver alloy membrane as the hydrogen diffusion electrode. Likewise, U.S. Pat. No. 3,332,806 discloses the use of thin palladium-silver alloy foils supported by gold-nickel grid supports. U.S. Pat. Nos. 3,266,263 and 3,303,055 disclose porous fuel cell electrodes that have varying porosity through the electrode. These latter electrodes are planar in construction. More recent U.S. Pat. No. 3,981,749 discloses a planar gas diffusion electrode which has varying porosity throughout its structure which is formed of a binding agent and a substance such as graphite, nickel oxide, aluminum oxide, or the like is provided on the electrolyte side of the high porosity electrode. The hollow fibers described herein are substantial improvements over these efforts.

The ready application of specific catalyst material, if needed, to the internal surface of the wall of the hollow fiber may allow smaller amounts of precious metal catalysts to be used. Further, the metal hollow fiber could be made of nickel or cobalt where the surfaces could readily be modified chemically for catalyst activity.

The use of air to provide oxygen for the fuel cell is another application of the hollow fibers of this invention. For such oxygen electrodes it is desirable to have a large diffusion surface area; to separate the oxygen from the nitrogen and carbon dioxide (to prevent the precipitation of electrolyte carbonates); to have a catalytic surface for the oxidation or reduction of the oxygen; to extend the capability of the separation system to the temperature region useful for the oxygen electrode; and to provide a current collecting surface for the electrode.

All these objectives can be achieved with the hollow fibers of this invention. The catalytic element could be furnished on the surface of the fiber or, if economy permits, the catalytic element could be used throughout the fiber. In addition, a surface is provided to enhance the oxygen separation process. This could be the same metal as the catalyst in the compact layer or it could be a separate metal or a suitable polymer material placed on the fiber after formation.

One mode of operation would circulate air into the bore of the fiber. Some oxygen will diffuse through the essentially non-porous compact layer to the outside of the fiber and the remaining nitrogen and carbon dioxide could be discharged from the fiber bore. A slight depletion of oxygen would occur in the air stream passing through the hollow fiber bore. The metal comprising the oxygen electrode hollow fiber, for instance silver, would allow the electrode to operate at temperatures beyond the reach of polymeric hollow fibers. Silver and platinum can be used as catalysts in this electrode. The oxygen electrode described would also be useful in a fuel cell such as a methanol-oxygen cell.

A rather unique application for the essentially non-porous compact layer fibers of this invention is in the sodium-sulfur battery. In this battery, thin walled solid electrolytes, such as $\beta$-alumina, separate the sodium from the sulfur and have been found to be technically feasible. $\beta$-alumina as the sinterable inorganic material of the fiber of this invention provides excellent solid electrolytes for such batteries.

The invention is further illustrted by, but not limited to, the following examples.

EXAMPLE 1

599 grams of hematite ($Fe_2O_3$), 500 grams of magnitite ($Fe_2O_4$), and 212.1 grams of an acrylonitrile copolymer (about 93% acrylonitrile and about 7% vinyl acetate) were intimately mixed in a rod mill for 10 hours. The hematite and the magnitite had an average particle size of about 1 micron and 0.7 micron, respectively. 850 cc of dimethylacetamide and 0.5 cc of a wetting agent (Tween 40) were mixed and chilled to $+10°$ C. and placed into a large Waring Blender (Model No. 1112). The mixture of oxide and polymer were transferred to the blender and stirred in by hand to give a reasonably uniform mixture. The mixture was chilled to $+10°$ C. to reduce the solvency of the solvent and allow the polymer to be dispersed mechanically with little going into solution. The blender was turned on high speed causing further blending of the oxide and complete dissolution of the polymer. The blender was turned off when a temperature of about 42.5° C. was obtained as determined by a thermocouple in the mixture. The heat for the temperature rise being supplied by the degradation of mechanical energy. During the mixing period, a vacuum of about 56 cm of mercury was maintained over the contents of the blender to reduce the amount of air entrapment in the mixture. The resulting mixture was a solution of the acrylonitrile copolymer containing a uniform dispersion of hematite and magnitite particles.

This mixture was transferred to the dope pot of a spinning line having a spinneret immersed in a coagulating bath. Here the mixture was subjected to a vacuum of about 56 cm of mercury for 0.5 hour. It was then pressurized to 2.4 kg/cm$^2$ for 0.25 hour. A gear pump (Zenith pump, size number one, hereafter a one capacity pump) rotating at 8.0 rpm delivered 4.6 cubic centimeters of the mixture per minute. The mixture was filtered through a filter stack having a final stainless steel screen of 120 mesh. The filtered mixture entered a hollow fiber spinneret having an outer diameter of about 559 microns. The center pin of 240 microns O.D. and 152 microns I.D. delivered water for inner coagulation at the rate of 2 cc per minute through the center pin capillary. The extruded fiber was externally coagulated in a coagulating bath held at 30° C. The temperature of the mixture in the dope pot was higher than the temperature in the coagulating bath. The coagulating bath contained 50%, by volume, of dimethylacetamide and water.

The fiber was taken up at a first godet at 15 meters per minute and proceeded through the process at substantially this same rate. Leaving the process, the precursor fiber was taken up on a bobbin using a Leesona winder. The bobbin from the spinning line was placed at the input side of a furnace conversion system. A portion of the precursor fiber on this bobbin was fed into the furnace and converted at 1100° C.; reducing gases being fed into the exit end of the furnace at the rate of 15 liters per minute. The reducing gas contained about 88/2% hydrogen, 6.7% methane and 5.1% carbon monoxide.

The resultant iron fiber had a radially anisotropic internal void volume wall structure with an outer diameter of about 572 microns and an inner diameter of about 173 microns.

At the peripheral internal zone the fiber wall structure is highly fractured.

EXAMPLE 2

1000 grams of black nickel (ic) oxide, a nickel oxide obtained from Fisher Scientific Co. as Fisher N-66, were mixed with 800 cc of dimethylacetamide and 1.2 cc of Tween 40 (wetting agent). The mixture was thoroughly mixed and agglomerates of the oxide were broken up in a Waring Blender for 0.5 hour. The contents of the blender were chilled to $+10°$ C. 205 grams of an acrylonitrile copolymer (about 93% acrylonitrile and about 7% vinyl acetate) was added to the blender and premixed by hand to thoroughly wet the polymer and produce a reasonably uniform mixture. The blender was turned on to high speed causing further mixing of the oxide and complete dissolution of the polymer. The blender was turned off when the temperature reached about 65° C. as determined by a thermocouple in the mixture. The heat for the temperature rise being supplied by the degradation of mechanical energy. During the mixing period, a vacuum of about 56 cm of mercury was maintained over the contents of the blender to reduce air entrapment in the mixture. The resulting mixture was a solution of the acrylonitrile copolymer containing a fine dispersion of nickel oxide particles.

This mixture was transferred to the dope pot of a spinning line having a spinneret immersed in a coagulating bath. The mixture was subjected to a vacuum of about 56 cm of mercury for 0.5 hour. It was then pressurized to 2.4 kg/cm$^2$ for 0.5 hour. A one capacity pump rotating at 12 rpm delivered 7.0 cc per minute of the mixture. The mixture was filtered through a stack having a final stainless steel screen of 160 mesh. The filtered mixture entered a hollow fiber spinneret having an outer diameter of about 1067 microns and an inner pin with an O.D. of about 711 microns and an I.D. of about 406 microns. Water served as the inner coagulant and flowed at a rate of 0.62 cc per minute through the center pin. The resulting extruded fiber was externally coagulated in a 45% dimethylacetamide, 55% water, by volume, coagulating bath held at 27° C. The temperature of the mixture in the dope pot was higher than the temperature in the coagulating bath. The fiber was taken up at a first godet at 6 meters per minute and was washed with water at a second godet followed by stretching (2.5 fold) in boiling water between the second and third godet. The fiber was relaxed at an 0.8 ratio between the third and fourth godet. Finally, the fiber was taken up at 12 meters per minute on a bobbin using a Leesona winder.

The precursor fiber, after drying on the bobbin, was placed at the input side of a conversion furnace. A portion of the precursor fiber on the bobbin was fed into the furnace and converted at 1100° C.; reducing gases being fed into the exit end of the furnace at a rate of 14 liters per minute. The reducing gas consisted of 1.9% CO and the remainder hydrogen. Both the precursor fiber and the nickel fiber exhibited a radially anisotropic internal void volume wall structure having a compact layer at the fiber's external surface. The fiber has an outer diameter of about 663 microns and an inner diameter of about 203 microns.

EXAMPLE 3

A mixture of 500 grams of hematite (Fe$_2$O$_3$), 500 grams of nickel (ic) oxide, and 250 grams of an acrylonitrile copolymer (about 93% acrylonitrile and about 7% vinyl acetate) were mixed in a rod mill overnight. A mixture of 800 cc of dimethylacatamide and 1.2 cc of a wetting agent (Tween 40) was chilled to $+10°$ C. in a large Waring Blender. The mixture of oxides and polymer were transferred to the blender and stirred in by hand to give a reasonably uniform mixture. The blender was turned on high speed causing further blending of the oxide and complete dissolution of the polymer. The blender was turned off when the temperature of the mixture reached about 42.5° C. During the mixing period, a vacuum of about 56 cm of mercury was maintained over the contents of the blender to reduce air entrapment in the mixture. The resulting mixture was a solution of the acrylonitrile copolymer containing a fine dispersion of the nickel and iron oxide particles.

The mixture was transferred to the dope pot of a spinning line having a spinneret immersed in a coagulating bath. Here the mixture was subjected to a vacuum of about 56 cm of mercury for 0.5 hour and then pressurized to 2.4 kg/cm$^2$ for 0.5 hour. A one capacity pump rotating at 12.0 rpm delivered 7.0 cc of the mixture per minute. The mixture was filtered through a filter stack having a final stainless steel screen of 120 mesh. The filtered mixture was extruded as a hollow fiber through a spinneret having an outer diameter of about 635 microns with a centrally located hollow pin having 254 microns O.D. and 152 microns I.D. Water served as the inner coagulant and flowed at the rate of 5.0 cc per minute through the center pin. The fiber was coagulated in a 50% dimethylacetamide, 50% water, by volume, coagulating bath at 27° C. The temperature of the mixture in the dope pot was higher than the temperature in the coagulating bath. The fiber was taken up at a first godet at 6 meters per minute and was washed with the coagulating bath mixture. The fiber was also washed with water on a second godet followed by stretching 2.5 fold, in boiling water, between the second and third godet. The fiber was relaxed at an 0.8 ratio between the third and fourth godet and taken up on a bobbin using a Leesona winder at 12 meters per minute. The precursor fiber, after drying on the bobbin, was placed at the input side of a conversion furnace. A portion of the precursor fiber on the bobbin was fed into the furnace and converted at 1100° C.; reducing gases being fed into the exit end of the furnace at a rate of 14 liters per minute. The reducing gas consisted of 1.9% CO and the remainder hydrogen. Both the precursor fiber and the nickel alloy fiber exhibited a radially anisotropic internal void volume wall structure having a compact layer at the fiber's external surface. The nickel alloy fiber has an outer diameter of about 559 microns and an inner diameter of about 173 microns.

EXAMPLE 4

128.8 grams of sodium silicate (anhydrous), 28.8 grams of silicon dioxide and 40.6 grams of calcium oxide were mixed into 600 cc of dimethylacetamide.

The mixture was thoroughly mixed and agglomerates broken up in a Waring Blender for 0.5 hour. The contents of the blender were then chilled to $+10°$ C. 135.9 grams of an acrylonitrile copolymer (about 93% acrylonitrile and about 7% vinyl acetate) were added to the blender and hand blended to give a reasonably uniform mixture.

The blender was turned on to high speed causing further mixing of the oxide and complete dissolution of the polymer. The blender was turned off when the temperature of the mixture reached 100° C. During mixing a vacuum of about 56 cm of mercury was maintained over the contents of the blender to reduce air entrapment in the mixture.

The resulting mixture was a solution of the acrylonitrile copolymer containing a fine dispersion of the sodium silicate, silicon dioxide and calcium oxide particles.

This mixture was transferred to the dope pot of a spinning line. Here the mixture was subjected to a vacuum of about 56 cm of mercury for 0.5 hour. It was then pressurized to 2.4 kg/cm$^2$ for spinning having a spinneret immersed in a coagulating bath. A one capacity pump rotating at 25 rpm delivered 14.6 cc per minute of the mixture. The mixture was filtered through a coarse screen of 80 mesh. The filtered mixture entered a hollow fiber spinneret having an outer diameter of about 1321 microns and a hollow center pin with an O.D. of 889 microns and an I.D. of 584 microns. Water served as the inner coagulant and flowed at 3.1 cc per minute through the center pin. The fiber was coagulated in a 45% dimethylacetamide, 55% water, by volume, coagulating bath at 27° C. The temperature of the mixture in the dope pot was higher than the temperature in the coagulating bath. The spinning was intermittent but samples of precursor fiber were obtained that had a radially anisotropic internal void volume wall structure. A section of the precursor fiber was passed through a furnace at 1100° C. for eight minutes in a nitrogen atmosphere. The section of precursor fiber turned black, probably due to the presence of particles of carbon. This fiber sample was then heated in the presence of air at 1000° C. for one hour. The resulting section of glass hollow fiber was hard, continuous having a radially anisotropic internal void volume wall structure with a compact layer at the fiber's external surface. The fiber has an outer diameter of about 1311 microns and an inner diameter of about 1048 microns.

EXAMPLE 5

A mixture of 920 grams of nickel (ic) oxide (Fisher N-66), 80 grams of magnetite (Fe$_3$O$_4$) (Fisher I-119) and 800 cc of dimethylacetamide was placed in a ball-mill containing steel balls. The ball mill was run until these materials were thoroughly mixed and the agglomerates and other large particles were essentially broken up. This mixture was chilled to approximately +10° C. and filtered through a Buckner funnel, which used a fine filter medium of 100% nylon filter fabric, Style No. W.N.H.-Y 7MO-PD8 (Feon). The steel balls were separated through a large screen located above the Buckner funnel. The filter fabric removed any large particles or agglomerates which were not broken up during the ball-milling.

The effluent from the filter flowed directly from the funnel into a large Waring Blender. 204.8 grams of a copolymer of acrylonitrile (about 93% acrylonitrile and about 7% vinyl acetate) was added to the blender and premixed to produce a reasonably uniform mixture. (The solvent had been chilled to allow premixing of the polymer without dissolution.) The blender caused further mixing of the oxides and dissolution of the polymer. The blending was completed when the temperature reached 75° C. as sensed by a thermocouple immersed in the mixture. The heat for the temperature rise was supplied by the degradation of mechanical energy during mixing. In this mixing period, a vacuum of about 56 cm of mercury was maintained over the contents of the blender to reduce gas entrapment in the mixture. The resulting mixture was a solution of the acrylonitrile copolymer containing a uniform dispersion of the oxide particles.

This mixture was immediately transferred to the dope pot of a spinning line having a spinneret immersed in a coagulating bath. The mixture was subjected to a pressure of 4.2 kg/cm$^2$, and pumping commenced. A one capacity pump rotated at 6.0 rpm to deliver 3.5 cc of the mixture per minute. The mixture was filtered in line through a stack having a final steel screen of 400 mesh. The filtered mixture entered a spinneret for the formation of the hollow fiber. This spinneret had an outer diameter of about 711 microns and a center pin of about 457 microns O.D. and 254 microns I.D. The inner coagulant, which was water at 22° C., flowed at a rate of 0.76 cc per minute through the center pin. The coagulating bath, at 18° C., contained a 65% dimethylacetamide and 35% water. The temperature of the mixture in the dope pot was higher than the temperature of the coagulating bath. The fiber, after passing through the coagulating bath, was taken up at a first godet at a rate of 6 meters per minute. It was washed on this godet with solution from the coagulating bath (further aiding the coagulation process). The fiber was washed on a second godet with deionized water. The fiber was then stretched (2.5 fold) between the second and third godet in a stretch bath containing boiling water. After stretching, the fiber was relaxed (annealed) at a 0.8 ratio between the third and fourth godets. Finally, the fiber was taken up at 12 meters per minute on a bobbin using a Leesona winder. The polymeric precursor hollow fiber had an outer diameter of about 643 microns, and an inner diameter of roughly 0.5 this value.

The bobbin, containing the precursor fiber, was soaked for approximately 18 hours in a container with a constant flow of fresh dionized water. After drying in air at room temperature and humidity for 24 hours (approximately 25° C. and 50% R.H.), the bobbin was placed at the input side of a conversion furnace. The fiber was unwound from the bobbin in a water container prior to metering and steaming. The fiber then entered the furnace by means of a conveyor belt through a small gate opening. The furnace temperature was 1080° C. and was fed at a rate of 7.6 liters per minute with a gas whose composition contained about 34.4% hydrogen, 0.9% carbon monoxide, and 64.7% nitrogen. The conversion time for the operation was 8 minutes at the operating temperature.

The resulting nickel-iron alloy fiber, as did the precursor fiber, had a wall structure having a radially anisotropic internal void volume and a skin on the external surface. The fiber was tough and ductile. The fiber had an outer diameter of about 318 microns and an inner diameter of about 203 microns.

During a test, with a reformer gas containing about 37% hydrogen and 51% water vapor with the remaining portions consisting of small amounts of carbon monoxide, carbon dioxide, and methane, the permeation rate found for hydrogen at various temperatures is shown in the following Table.

| Table | |
|---|---|
| Temperature (°C.) | Permeation Rate [cm$^3$(STP)/cm$^2$-sec-(cmHg)$^{0.5}$] |
| 700 | $1.2 \times 10^{-3}$ |
| 750 | $1.7 \times 10^{-3}$ |
| 800 | $2.2 \times 10^{-3}$ |
| 855 | $3.0 \times 10^{-3}$ |

EXAMPLE 6

A mixture of 264 grams of β-alumina (calcined XB-2, Superground from Alcoa Chemicals Company) and 600 cc of dimethylacetamide was placed in a ball-mill containing ceramic balls. The mixture was milled for approximately 100 hours to thoroughly mix the ingredients and break up agglomerates. The contents of the ball-mill was then transferred to a large Waring Blender after separation of the ceramic balls. The contents of the blender was chilled to −10° C. and an acrylonitrile copolymer (about b 87% acrylonitrile, about 7% vinyl acetate and about 6% vinyl bromide) was added together with 0.6 cc of a wetting agent (Tween 40). The resulting slurry was chilled to allow premixing of the copolymer without dissolution. The blender caused further mixing of the β-alumina and dissolution of the polymer. Mixing was completed when a temperature of 65° C. was reached. The heat for the temperature rise was supplied by the degradation of mechanical energy during mixing. While mixing, a vacuum was maintained over the contents of the blender to reduce gas entrapment in the mixture. The resulting mixture was a solution of the acrylonitrile copolymer containing a uniform dispersion of the β-alumina particles.

This mixture was transferred to the dope pot of a spinning line having a spinneret immersed in a coagulating bath. The mixture was subjected to a pressure of 4.5 kg/cm$^2$ and pumping commenced. A one capacity pump delivered the mixture at a rate of 7.0 cc per minute. The mixture was filtered through a 60 mesh in-line filter. The filtered mixture entered a spinneret for the formation of a hollow fiber. This spinneret had an outer diameter of about 1067 microns with a center pin of about 711 microns O.D. and about 406 microns I.D. The inner coagulating fluid, water at 22° C., flowed at a rate of 3.0 cc per minute through the center pin. The coagulating bath was a 50%, by volume, mixture of dimethylacetamide and water at 21° C. The temperature of the mixture in the dope pot was higher than the temperature in the coagulating bath. The coagulated fiber was taken up at a first godet at the rate of 6 meters per minute and washed with the coagulating bath solution which further aided coagulation. The fiber was washed with deionized water on the second godet. The fiber was stretched (2.5 fold) between the second and third godet in boiling water. To increase toughness, the fiber was relaxed (0.8 ratio) between the third and fourth godet in boiling water. Finally the fiber was taken up at 12 meters per minute on a bobbin using a Leesona winder. A portion of the resulting fiber was soaked overnight in a 10% sodium carbonate solution and dried in a drying oven at approximately 65° C. under about 56 cm of mercury vacuum for about 2 hours. A section of this dried precursor fiber was covered with alumina powder and heated under nitrogen to 1750° C. and held at that temperature for 1 hour. The resulting hollow fiber, comprising β-alumina, and the precursor fiber exhibited a radially anisotropic internal void volume wall structure having a compact layer at the fiber's external surface. The fiber has an outer diameter of about 599 microns and an inner diameter of about 318 microns.

EXAMPLE 7

292 grams of aluminum atomized powder (Reynolds Metals Co., grade 1-131) and 204.8 grams of a copolymer of acrylonitrile (about 93% acrylonitrile and about 7% vinyl acetate) were hand dispersed into 800 cc of dimethylacetamide solvent previously chilled to +10° C. Thorough mixing of the aluminum powder and dissolution of the copolymer was carried out in a Waring Blender until a final temperature of 70° C. was reached. The heat for the temperature rise was obtained from the degradation of mechanical energy during mixing. The resulting mixture was transferred from the blender to the dope pot of a spinning line having as hollow fiber spinneret immersed in a coagulating bath. A one capacity pump delivered 7.0 cc of the mixture per minute to a spinneret. The spinneret had an outer diameter of about 1829 microns with a center pin of 1245 microns O.D. and 838 microns I.D. The inner coagulating fluid, supplied to the center pin, was water at approximately 25° C. The coagulating bath was a 65% dimethylacetamide, by volume, mixture with water at 18° C. The temperature of the mixture in the dope pot was higher than the temperature in the coagulating bath. The coagulated fiber was taken up from the coagulating bath on a first godet at 6 meters per minute and washed with the coagulating bath solution to further aid coagulation. The fiber was washed with deionized water on the second godet. The fiber was then stretched (2.5 fold) between the second and third godet in boiling water. The fiber was then annealed (0.8 ratio) between the third and fourth godet in boiling water. Samples of the resulting precursor hollow fiber were taken from the fourth godet. These were examined microscopically and found to have a radially anisotropic internal void volume wall structure.

A sample of the precursor fiber was placed in a tube furnace and allowed to heat up to 1000° C. in the presence of air. The sample was then held at this temperature for two hours. After allowing the fiber to cool, the resulting aluminum oxide hollow fiber was examined and found to also have a radially anisotropic internal void volume wall structure. The fiber has an outer diameter of about 823 microns and an inner diameter of about 404 microns.

While the invention has been described herein with regard to certain specific embodiments, it is not so limited. It is to be understood that variations and modifications thereof may be made by those skilled in the art without departing from the spirit and scope of the invention.

What is claimed is:

1. An essentially inorganic, sintered monolithic hollow fiber having a radially anisotropic internal void volume wall structure.

2. A fiber according to claim 1 which has an internal void volume of from about 15% to about 95%.

3. A fiber according to claim 2 which has an internal void volume of from about 45% to about 90%.

4. A fiber according to claim 2 having an internal void volume in the peripheral external zone of from about 10 to about 35% and an internal void volume in the peripheral internal zone of from about 75 to about 95%.

5. A fiber according to claim 1 which has an outer diameter of up to about 2000 microns.

6. A fiber according to claim 5 which has an outer diameter of from about 50 to about 700 microns.

7. A fiber according to claim 6 which has an outer diameter of from about 100 to about 550 microns.

8. A fiber according to claim 1, 2, 3, 4, 5, 6 or 7 having a compact layer.

9. A fiber according to claim 8 wherein the compact layer comprises a skin at the external surface of the fiber.

10. A fiber according to claim 9 wherein the skin is essentially non-porous.

11. A fiber according to claim 10 wherein the skin has an effective thickness of less than about 50% of the wall thickness.

12. A fiber according to claim 8 wherein the compact layer comprises a skin at the internal surface of the fiber.

13. A fiber according to claim 12 wherein the skin is essentially non-porous.

14. A fiber according to claim 13 wherein the skin has an effective thickness of less than about 50% of the wall thickness.

15. A fiber according to claim 8 wherein the compact layer is within the fiber wall.

16. A fiber according to claim 15 wherein the compact layer within the fiber wall is essentially non-porous.

17. A fiber according to claim 16 wherein the compact layer has an effective thickness of less than about 50% of the wall thickness.

18. A fiber according to claim 5 which has a wall thickness of from about 20 to about 300 microns.

19. A fiber according to claim 18 which has a wall thickness of from about 50 to about 200 microns.

20. A fiber according to claim 8 wherein the thickness of the compact layer is less than about 50% of the wall thickness.

21. A fiber according to claim 1 which comprises a metal.

22. A fiber according to claim 21 which has an internal void volume of from about 15% to about 95%.

23. A fiber according to claim 22 which has an internal void volume of from about 45% to about 90%.

24. A fiber according to claim 22 having an internal void volume in the peripheral external zone of from about 10 to about 35% and an internal void volume in the peripheral internal zone of from about 75 to about 95%.

25. A fiber according to claim 21 which has an outer diameter of up to about 2000 microns.

26. A fiber according to claim 25 which has an outer diameter of from about 50 to about 700 microns.

27. A fiber according to claim 26 which has an outer diameter of from about 100 to about 550 microns.

28. A fiber according to claim 21, 22, 23, 24, 25, 26 or 27 having a compact layer.

29. A fiber according to claim 28 wherein the compact layer comprises a skin at the external surface of the fiber.

30. A fiber according to claim 29 wherein the skin is essentially non-porous.

31. A fiber according to claim 30 wherein the skin has an effective thickness of less than about 50% of the wall thickness.

32. A fiber according to claim 28 wherein the compact layer comprises a skin at the internal surface of the fiber.

33. A fiber according to claim 32 wherein the skin is essentially non-porous.

34. A fiber according to claim 33 wherein the skin has an effective thickness of less than about 50% of the wall thickness.

35. A fiber according to claim 28 wherein the compact layer is within the fiber wall.

36. A fiber according to claim 35 wherein the compact layer within the fiber wall is essentially non-porous.

37. A fiber according to claim 36 wherein the compact layer has an effective thickness of the less than about 50% of the wall thickness.

38. A fiber according to claim 25 which has a wall thickness of from about 20 to about 300 microns.

39. A fiber according to claim 38 which has a wall thickness of from about 50 to about 200 microns.

40. A fiber according to claim 28 wherein the thickness of the compact layer is less than 50% of the wall thickness.

41. A fiber according to claim 28 wherein the metal is nickel or a nickel alloy.

42. A fiber according to claim 41 wherein the metal is a nickel alloy comprising nickel and iron.

* * * * *

UNITED STATES PATENT AND TRADEMARK OFFICE
CERTIFICATE OF CORRECTION

PATENT NO. : 4,175,153

DATED : November 20, 1979

INVENTOR(S) : Emerick J. Dobo and Tommy E. Graham

It is certified that error appears in the above-identified patent and that said Letters Patent are hereby corrected as shown below:

Figure 1 and Figure 2 as shown below with the scale included.

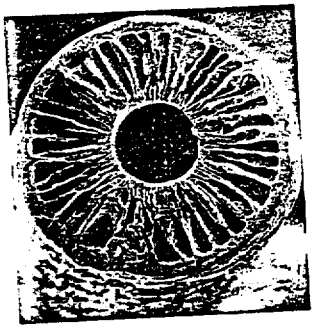

FIG. 1.

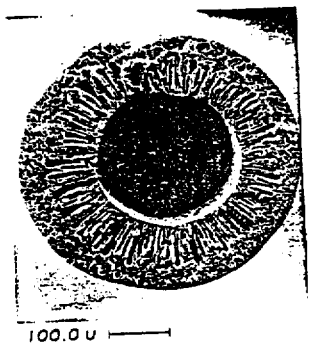

FIG. 2.

Signed and Sealed this

Twelfth Day of August 1980

[SEAL]

Attest:

Attesting Officer

SIDNEY A. DIAMOND

Commissioner of Patents and Trademarks